(12) United States Patent
Matsumoto

(10) Patent No.: US 7,259,820 B2
(45) Date of Patent: Aug. 21, 2007

(54) ACTIVE MATRIX TYPE LIQUID CRYSTAL DISPLAY DEVICE AND METHOD OF MANUFACTURING THE SAME

(75) Inventor: Kimikazu Matsumoto, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 0 days.

(21) Appl. No.: 10/800,738

(22) Filed: Mar. 16, 2004

(65) Prior Publication Data

US 2004/0174484 A1    Sep. 9, 2004

Related U.S. Application Data

(62) Division of application No. 10/096,905, filed on Mar. 14, 2002, now abandoned.

(30) Foreign Application Priority Data

Mar. 15, 2001    (JP) .............................. 2001-073880

(51) Int. Cl.
    *G02F 1/1343*    (2006.01)
(52) U.S. Cl. ...................... 349/139; 349/111
(58) Field of Classification Search ................ 349/111, 349/139, 110
    See application file for complete search history.

(56) References Cited

U.S. PATENT DOCUMENTS

| | | | |
|---|---|---|---|
| 5,870,157 A * | 2/1999 | Shimada et al. ............ 349/106 |
| 6,069,678 A | 5/2000 | Sakamoto et al. |
| 6,208,399 B1 | 3/2001 | Ohta et al. |
| 6,297,867 B1 | 10/2001 | Miyahara et al. |
| 6,388,725 B2 | 5/2002 | Ohta et al. |
| 6,392,730 B2 | 5/2002 | Ohta et al. |
| 6,429,918 B1 * | 8/2002 | Choi et al. .................. 349/111 |
| 6,486,933 B1 * | 11/2002 | Cha et al. .................... 349/139 |
| 6,512,567 B2 | 1/2003 | Ohta et al. |
| 6,522,369 B2 | 2/2003 | Ohta et al. |
| 6,587,170 B2 | 7/2003 | Shin et al. |
| 6,693,687 B2 | 2/2004 | Ohta et al. |
| 6,738,108 B2 | 5/2004 | Ohta et al. |
| 6,757,031 B2 * | 6/2004 | Lin et al. ....................... 349/43 |
| 2001/0009447 A1 | 7/2001 | Ohta et al. |
| 2001/0010573 A1 | 8/2001 | Ohta et al. |
| 2001/0046017 A1 | 11/2001 | Niwano et al. |
| 2002/0105611 A1 | 8/2002 | Ohta et al. |
| 2002/0105612 A1 | 8/2002 | Ohta et al. |
| 2003/0147021 A1 | 8/2003 | Ohta et al. |
| 2003/0156232 A1 | 8/2003 | Ohta et al. |

FOREIGN PATENT DOCUMENTS

| | | |
|---|---|---|
| JP | 11-119237 | 4/1999 |
| KR | 1998-033299 | 7/1998 |
| KR | 2001-0006187 | 1/2001 |

* cited by examiner

*Primary Examiner*—David Nelms
*Assistant Examiner*—Richard H Kim
(74) *Attorney, Agent, or Firm*—Foley & Lardner LLP

(57) ABSTRACT

In an active matrix type liquid crystal display device in which a common electrode and a second pixel electrode have portions opposing each other, and an electric field parallel to substrates is formed between the two electrodes, Y direction extending portions of the common electrode are provided above data lines via a second interlayer insulation film. Slits are opened in the Y direction extending portions of the common electrode along the data lines. Portions of a black matrix which are set to a common electric potential with the common electrode are provided on an opposing substrate at positions opposing the slits.

6 Claims, 19 Drawing Sheets

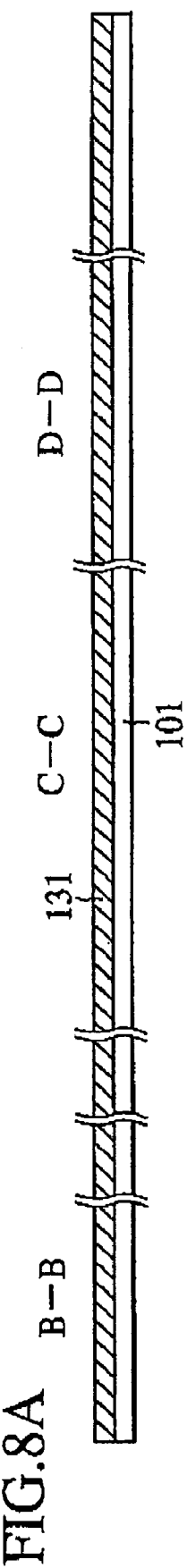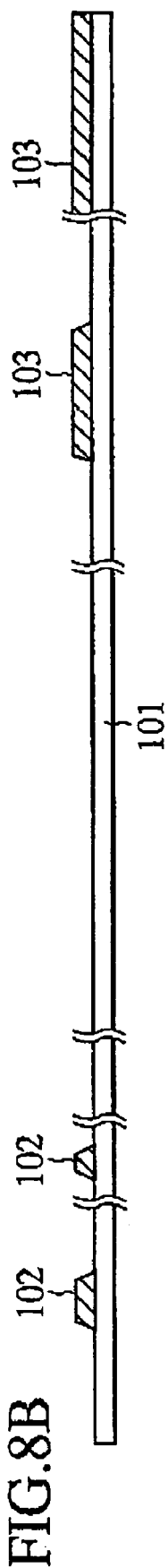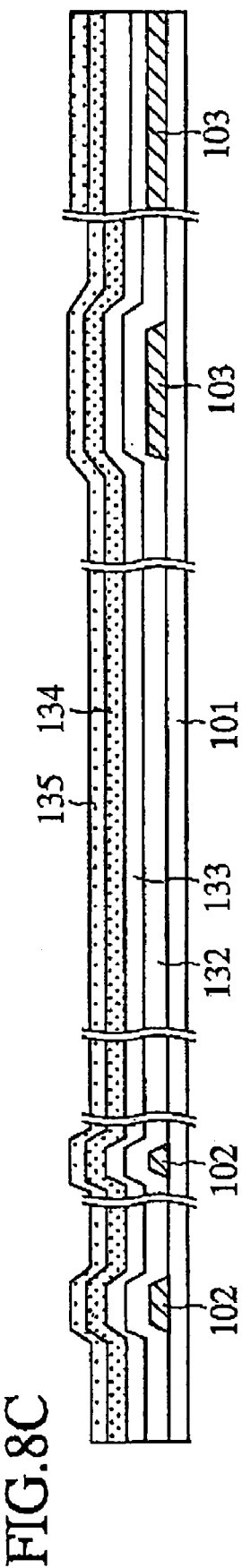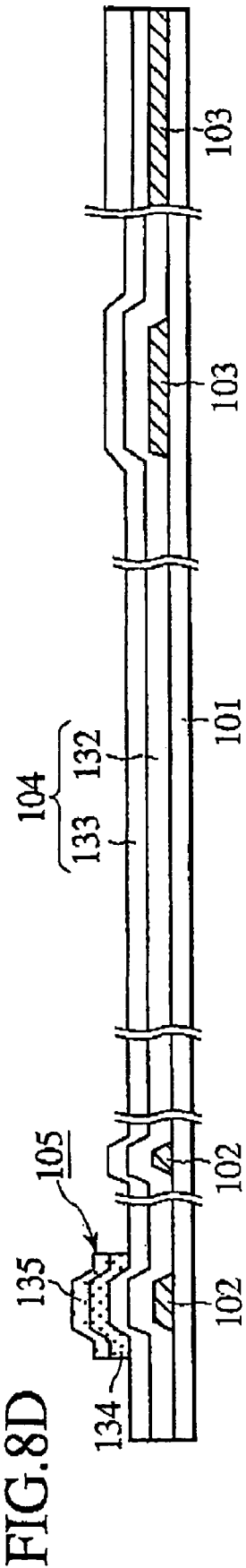

ns line 102 via the interlayer insulation film 104a.

ACTIVE MATRIX TYPE LIQUID CRYSTAL DISPLAY DEVICE AND METHOD OF MANUFACTURING THE SAME

CROSS-REFERENCE TO RELATED PATENT APPLICATION

This application is a division of application Ser. No. 10/096,905, filed Mar. 14, 2002 now abandoned, and based on Japanese Patent Application No. 2001-073880, filed Mar. 15, 2001, by Kimikazu Matsumoto. This application claims only subject matter disclosed in the parent application and therefore presents no new matter.

BACKGROUND OF THE INVENTION

1. Field of the Invention

The present invention relates to an active matrix type liquid crystal display device having a high performance characteristic and a method of manufacturing the same.

2. Description of the Related Art

There has been developed a so-called In-Plane Switching (IPS) method in which an electric field parallel to a substrate is applied to a liquid crystal for an active matrix type liquid crystal display device. An IPS type liquid crystal display device has such advantages in that a wide angle of view can be obtained.

FIG. 14 shows one example of a plan layout of a unit pixel area included in an active matrix type liquid crystal display device according to the IPS method. FIG. 15 shows a cross section of the liquid crystal display device shown in FIG. 14 as sectioned along a direction PP. As shown in FIG. 15, the liquid crystal display device comprises a TFT substrate 100, an opposing substrate 200, and a liquid crystal 300. The liquid crystal display device is structured by filling a space between the TFT substrate 100 and the opposing substrate 200 which are set opposite from each other via a spacer and sealing member (both not illustrated) with the liquid crystal 300.

The TFT substrate 100 comprises a first transparent substrate 101 made of transparent glass or the like. Scanning lines 102 (not illustrated in FIG. 15) and common wirings 103 are formed on one surface of the first transparent substrate 101. As shown in FIG. 14, adjacent two scanning lines 102 having a predetermined space therebetween extend toward an X direction almost in parallel, and determine the X direction of the unit pixel area. The common wirings 103 extend almost in parallel with the scanning line 102, and are so arranged that two of the common wirings 103 sandwich one scanning line 102. That is, a unit pixel area has two common wirings 103 crossing thereinside. The two common wirings 103 are connected to each other by three common electrodes 111 which extend in the unit pixel area toward a Y direction almost perpendicularly to the common wirings 103. The common electrodes 111 include a center portion 111a which extends almost in the center of the pixel area, and edge portions 111b which extend in the both sides of the center portion 11a and have a larger width than that of the center portion 111a.

In FIG. 15, there is shown an interlayer insulation film 104a which is formed on the first transparent substrate 101, the scanning lines 102, and the common wirings 103. Data lines 106 and a pixel electrode 112 are formed on the interlayer insulation film 104a. A semiconductor island 105 shown in FIG. 14 is also formed on the interlayer insulation film 104a. The semiconductor island 105 constitutes a TFT (Thin Film Transistor). The semiconductor island 105 is provided on the scanning line 102 via the interlayer insulation film 104a.

The data lines 106 extend toward the Y direction almost perpendicularly to the scanning line 102, and determine the Y direction of the unit pixel area. The pixel electrode 112 is arranged in the center of the unit pixel area. The pixel electrode 112 includes two opposing portions 112a which extend toward the Y direction along the common electrodes 111, and two supporting portions 112b each of which is arranged so as to overlap a common wiring 103 and to support one edge of the opposing portions 112a. The opposing portions 112a of the pixel electrode 112 are arranged between the adjacent common electrodes 111 so as to oppose those common electrodes 111. Needless to say, as shown in FIG. 15, the interlayer insulation film 104a exists between the common electrodes 111 and the pixel electrode 112. Storage capacitors are formed between the common wirings 103 and the supporting portions 112b of the pixel electrode 112 which oppose each other via the interlayer insulation film 104a.

A passivation film 104b is formed on the interlayer insulation film 104a, the data lines 106, the pixel electrode 112, and the TFT. An orientation film 116 which has been subjected to a surface alignment treatment is formed on the passivation film 104b. A polarizing plate 119 is provided on the other surface of the first transparent substrate 101.

The opposing substrate 200 includes a second transparent substrate 201. A black matrix 202 having an opening is formed on one surface of the second transparent substrate 201. The black matrix 202 is made of a material having a light shielding effect, and provided so as to oppose the data lines 106 which determine the unit pixel area. The opening of the black matrix 202 is covered by a color layer 203. A flattening film 204 and an orientation film 205 are formed on the black matrix 202 and the color layer 203. A conductive layer 207 and a polarizing plate 208 are formed on the external surface of the second transparent substrate 201.

This liquid crystal display device operates as follows. In order to drive the liquid crystal display device, a driver circuit (not illustrated) applies a gate pulse to scanning lines 102 sequentially, and applies a data signal whose voltage corresponds to the display tone to the data lines 106 almost synchronously with the gate pulse. A TFT which is connected to a scanning line 102 to which a gate pulse is applied (selected) scanning line 102 is turned on, and a voltage which is applied to the data lines 106 at this time is applied to the pixel electrode 112 via a drain electrode 107, the semiconductor island 105, and a source electrode 108.

When the gate pulse is cut off, the TFT is turned off. The voltage applied to the pixel electrode 112 at that time is stored in the capacitors between pixel electrode 112 and the common electrode 111, and between the common wirings 103 and the pixel electrodes 112.

Thus, the voltage which corresponds to the display tone is applied to the liquid crystal of each unit pixel area until the next selection period. While this voltage is applied, an electric field parallel to the substrate is formed between the common electrodes 111 and the opposing portions 112a of the pixel electrode 112, and the liquid crystal is oriented in a desired state. Therefore, the color of the color layer 203 is displayed in a desired tone.

As described above, in this liquid crystal display device, an electric field is formed between the common electrodes 111 and the opposing portions 112a of the pixel electrode 112, and this electric field parallel to the substrate is applied to the liquid crystal 300. However, the data lines 106 are also formed closed to, and along the opposing portions 112a of the pixel electrode 112. Thus, an electric field is formed also between the data lines 106 and the pixel electrode 112 due to the potential difference between them. Part of this electric field "leaks" to some parts of the liquid crystal 300 that are close to the data lines 106. The so-called leak electric field disturbs the orientation of the liquid crystal 300 and causes disclination, thus display quality is deteriorated.

It is undesirable that the electric field caused by the data lines 106 leaks to the liquid crystal 300. Thus, the wider edge portions 111b of the common electrodes 111 are provided to reduce this leak electric field. As shown in FIG. 15, the electric field caused by the data lines 106 is terminated mainly by the edge portions 111b of the common electrodes 111, not by the pixel electrode 112. Therefore, electric field leakage to the liquid crystal 300 is prevented.

However, in order to obtain a sufficiently high prevention effect (shield effect) against leakage, it is necessary to widen the width of the edge portions 111b of the common electrodes 111. The common electrodes 111 are usually made of a metal having a light blocking effect such as chromium or the like. Therefore, as the width of the edge portions 1111b is widened, a ratio of the display area to the unit pixel area of the liquid crystal display device, i.e., the aperture ratio is reduced.

A structure wherein a common electrode is formed above a data line, such as disclosed in Unexamined Japanese Patent Application KOKAI Publication No. H11-119237, is proposed as a structure which can obtain a high shield effect while preventing reduction in the aperture ratio. FIG. 16 shows an example of a plan layout of a liquid crystal display device having such a structure. FIG. 17 shows a cross section of the display device shown in FIG. 16 when it is sectioned along a direction QQ. Components identical to those shown in FIGS. 14 and 15 are given the same reference numerals, and explanation for those components is omitted.

Unlike the liquid crystal display device shown in FIG. 15, in this liquid crystal display device, a pixel electrode 112 and a common electrode 111 are formed in a same plane above data lines 106.

As shown in FIG. 17, parts of the common electrode 111 are formed on a second interlayer insulation film 110 just above the data lines 106. As shown in FIG. 16, the common electrode 111 includes a supporting portion which overlaps a common wiring 103 shown in the upper side of FIG. 16 and extends toward an X direction, and two opposing portions which extend from the supporting portion toward a Y direction. The opposing portions have a length which is almost the same as a distance between two adjacent common wirings 103 existing in a unit pixel area. The common electrode 111 is electrically connected to the common wiring 103 via a contact hole 113 which penetrates a first interlayer insulation film 104 and the second interlayer insulation film 110.

As shown in FIG. 17, the pixel electrode 112 includes a first pixel electrode 109 formed on the first interlayer insulation film 104, and a second pixel electrode 112a formed on the second interlayer insulation film 110.

As shown in FIG. 16, the first pixel electrode 109 is formed in an H letter shape. That is, the first pixel electrode 109 has two linear portions arranged so as to overlap the common wirings 103, and a linear portion arranged so as to oppose the second pixel electrode 112 and to connect the two linear portions. A part of the first pixel electrode 109 is connected to a source electrode 108. A compensating capacitor is formed between the common wiring 103 and the first pixel electrode 109 which opposes the common wiring 103.

The second pixel electrode 112 includes three opposing portions, and a supporting portion for supporting the three opposing portions, and thus forms an E letter shape. The second pixel electrode 112 is arranged so as to engage with the common electrode 111 which is formed on the same surface. Adjacent two opposing portions of the second pixel electrode 112 sandwich one opposing portion of the common electrode 111a. The supporting portion of the common electrode 111 is arranged so as to overlap the common wiring 103 shown in the upper side of the FIG. 16, and is electrically connected to the common wiring 103 via the contact hole 113 for common electrode. The common electrode 111 and the second pixel electrode 112 are made of, for example, a material having an optical transmittance characteristic, such as ITO (Indium Tin Oxide) or the like.

In this liquid crystal display device, edge portions 111b included in the common electrode 111 that have a width wider than that of the data lines 106 are provided above the data lines 106. An electric field formed from the data lines 106 is terminated by the edge portions 111b of the common electrode 111 as indicated in FIG. 17 by arrows. Therefore, leakage of the electric field to the liquid crystal 300 is prevented. Thus, influence given on the electric field between the common electrode 111 and the pixel electrode 112 is reduced, and the deterioration of the displayed image is lowered.

However, since the data lines 106 and the edge portions 111b of the common electrode 111 oppose each other by almost the entire surfaces thereof via the second interlayer insulation film 110, electrostatic capacitance between the data lines 106 and the edge portions 111b of the common electrode 111 is relatively large. Thus, delay of the signal applied to the data lines 106 cannot be ignored.

To reduce such electrostatic capacitance, the second interlayer insulation film 110 between the data lines 106 and the edge portions 111b may be formed thicker. However, in this case, a longer time is required for forming the second interlayer insulation film 110, and thus the manufacturing throughput is lowered. And since the second interlayer insulation film 110 is formed thicker, a contact hole having a high aspect ratio will be formed. Thus, the yield is lowered, and the manufacturing cost is increased.

And since the opposing areas of the data lines 106 and the edge portions 111b of the common electrode 111 via the second interlayer insulation film 110 are large, there is a high possibility that an electrical short circuit (interlayer short circuit) is caused between the data lines 106 and the edge portions 111b due to a defect such as a pinhole caused in the second interlayer insulation film 110. The electrical short circuit increases the possibility that a line defect is caused when the display operation is performed.

In the above-indicated publication, an embodiment in which the edge portions of the common electrode are formed so as to cover a part of the data lines is also disclosed. However, in such a case where the edge portions of the common electrode are formed so as to overlap a part of the data lines, an electric field leaks to other parts of the unit pixel area than the data lines.

Moreover, in a case where the second interlayer insulation film 110 is made of an inorganic film such as a silicon oxide film or the like, the second interlayer insulation film 110 needs to be formed relatively thick, approximately 1 to 10 µm, since the dielectric constant is high. This brings about the same problems as described above. On the other hand, in a case where the second interlayer insulation film 110 is made of an organic film such as acrylic resin or the like, it can be formed to have a thickness of approximately 0.5 to 5 μm, since the dielectric constant is low. Thus, the problems caused by a thick film can be avoided. However, an organic film has a high permeability against ions. Thus, to prevent adhesion of ions to the back channel of a TFT, there is a limitation on materials which can be used as the organic film. And in a case where the second interlayer insulation film 110 is formed of a double-layered film made of an inorganic film and an organic film, there is a need to form openings respectively in the inorganic film and the organic film. Thus, manufacturing steps and manufacturing costs are largely increased.

To sum up, there has not conventionally been provided an active matrix type liquid crystal display device which can be manufactured without largely increasing the manufacturing steps and manufacturing costs, and which has lowered delay of a signal, and has decreased display defects.

SUMMARY OF THE INVENTION

To solve the above problems, an object of the present invention is to provide an active matrix type liquid crystal display device having a lowered delay of a signal and decreased display defects, and a manufacturing method thereof.

Another object of the present invention is to provide an active matrix type liquid crystal display device which is capable of preventing leakage of an electric field from data lines while lowering delay of a signal, and a manufacturing method thereof.

To accomplish the above objects, an active matrix type liquid crystal display device according to a first aspect of the present invention comprises:
  a pair of substrates;
  a liquid crystal sealed between the pair of substrates;
  a plurality of data lines and a plurality of scanning lines which are arranged so as to intersect each other on one surface of one of the pair of substrates;
  a switching element having an electric current path one end of which is connected to corresponding one of the data lines, and having a control terminal which is connected to corresponding one of the scanning lines;
  a pixel electrode which is provided above the data lines via an insulation film, and is connected to the other end of the electric current path of switching element; and
  a common electrode which opposes the data lines via the insulation film, has slits in portions overlapping the data lines, to generate an electric field between the pixel electrode.

The common electrode and the pixel electrode may respectively have linear portions which oppose with each other almost in parallel by a predetermined length.

The overlapping portions may be provided along the linear portions.

The slits may have a length which is almost the same as that of the liner portions.

The slits may be formed in almost a center of a width of the overlapping portions.

The overlapping portions of the common electrode may have a width equal to or wider than that of the data lines.

The slits may have a width smaller than that of the data lines.

The common electrode and the pixel electrode may be on a same plane.

The common electrode and the pixel electrode may be made of a transparent conductive material.

The common electrode and the pixel electrode may be on different planes respectively.

An electric field in a direction parallel to the pair of substrates may be formed between the common electrode and the pixel electrode.

An active matrix type liquid crystal display device according to a second aspect of the present invention comprises:
  a pair of substrates;
  a liquid crystal sealed between the pair of substrates;
  a plurality of data lines and a plurality of scanning lines which are arranged so as to intersect each other on one surface of one of the pair of substrates;
  a switching element having an electric current path one end of which is connected to corresponding one of the data lines, and having a control terminal which is connected to corresponding one of the scanning lines;
  a pixel electrode which is provided above the data lines via an insulation film, and is connected to the other end of the electric current path of the switching element;
  a common electrode which opposes to the data lines via the insulation film, has slits in portions overlapping the data lines, to generate an electric field between the pixel electrode; and
  a first conductive film which is provided on the other of the pair of substrates so as to oppose to the data lines via the slits, and is set to a common electric potential with the common electrode.

The common electrode and the pixel electrode may respectively have linear portions which oppose with each other almost in parallel by a predetermined length.

The overlapping portions may be provided along the linear portions.

The slits may have a length which is almost the same as that of the liner portions.

The slits may be formed in almost a center of a width of the overlapping portions.

The overlapping portions of the common electrode may have a width equal to or wider than that of the data lines.

The slits may have a width smaller than that of the data lines.

The common electrode and the pixel electrode may be on a same plane.

The common electrode and the pixel electrode may be made of a transparent conductive material.

The common electrode and the pixel electrode may be on different planes respectively.

The active matrix type liquid crystal display device may further comprise a plug which electrically connects the first conductive film and the common electrode with each other.

The active matrix type liquid crystal display device may further comprise:
  a common wiring which is provided on a plane different from that of the common electrode, and is electrically connected to the common electrode; and
  a plug which is connected to the common wiring, and electrically connects the first conductive film and the common electrode with each other.

A second conductive film may be provided between the first conductive film and the common wiring in order to enhance connection between the first conductive film and the common wiring.

The second conductive film may be made of a material same as that of the common electrode and/or the pixel electrode.

The first conductive film may have a width equal to or wider than that of the slits.

The first conductive film may function as a black matrix.

The active matrix type liquid crystal display device may further comprise a black matrix which is arranged on the other one of the pair of substrates in a predetermined pattern, and is covered by a flattening film.

The first conductive film may be provided on the flattening film.

The first conductive film may have a pattern which is almost the same as that of the black matrix.

An electric field parallel to the pair of substrates may be generated between the common electrode and the pixel electrode.

To accomplish the above objects, a method of manufacturing an active matrix type liquid crystal display device according to a third aspect of the present invention is a method of manufacturing a liquid crystal display device comprising: a pair of substrates; a thin film transistor which is provided on one of the pair of substrates; data lines which are connected to a drain of the thin film transistor; a pixel electrode which is connected to a source of the thin film transistor; and a common electrode which generates an electric field between the pixel electrode, the method comprising:

forming an insulation film on the data lines;
forming a first metal film on the insulation film; and
forming the common electrode by patterning the first metal film, with forming slits in portions of the common electrode that overlap the data lines.

The method of manufacturing an active matrix type liquid crystal display device may further comprise forming the pixel electrode in a shape having linear portions having a predetermined length, In the forming the common electrode, portions which oppose to the linear portions of the pixel electrode may be formed, and the slits may be formed to have a length which is almost the same as that of the linear portions.

In the forming the common electrode, the slits may be formed in almost a center of a width of the overlapping portions.

In the forming the common electrode, the overlapping portions of the common electrode may be formed to have a width equal to or wider than that of the data lines.

In the forming the common electrode, the slits may be formed to have a width smaller than that of the data lines.

The common electrode and the pixel electrode may be formed in a substantially same step.

A method of manufacturing a liquid crystal display device according to a fourth aspect of the present invention is a method of manufacturing a liquid crystal display device comprising: a pair of substrates; a thin film transistor which is provided on one of the pair of substrates; data lines which are connected to a drain of the thin film transistor; a pixel electrode which is connected to a source of the thin film transistor; and a common electrode which generates an electric field between the pixel electrode, the method comprising:

forming an insulation film which covers the data lines;
forming a first metal film on the insulation film;
forming the common electrode by patterning the first metal film, with forming slits in portions of the common electrode that overlap the data lines; and
forming a first conductive film on the other one of the pair of substrates, the first conductive film opposing to the data lines via the slits.

The method of manufacturing an active matrix type liquid crystal display device may further comprise forming the pixel electrode in a shape having linear portions having a predetermined length, wherein in said forming said common electrode, portions which oppose to said linear portions of said pixel electrode may be formed, and said slits may be formed to have a length which is almost the same as that of said linear portions.

In the forming the common electrode, portions which oppose the linear portions of the pixel electrode may be formed, and the slits may be formed to have a length which is almost the same as that of the linear portions.

In the forming the common electrode, the slits may be formed in almost a center of a width of the overlapping portions.

In the forming the common electrode, the overlapping portions of the common electrode may be formed to have a width equal to or wider than that of the data lines.

In the forming the common electrode, the slits may be formed to have a width smaller than that of the data lines.

The common electrode and the pixel electrode may be formed in a substantially same step.

The common electrode may be connected to a common wiring which is provided on a plane different from a plane on which the common electrode is formed.

The method of manufacturing an active matrix type liquid crystal display device may further comprise forming a plug which electrically connects the common wiring and the first conductive film with each other.

The method of manufacturing an active matrix type liquid crystal display device may further comprise forming a second conductive film between the common wiring and the plug.

The second conductive film may be formed together with the common electrode and/or the pixel electrode in a same step.

The method of manufacturing an active matrix type liquid crystal display device may further comprise:

forming a black matrix having a predetermined pattern on one surface of the other one of the pair of substrates; and
forming a flattening film on the black matrix.

The first conductive film may be formed on the flattening film.

In the forming the first conductive film, the first conductive film may be formed in a pattern same as that of the black matrix.

BRIEF DESCRIPTION OF THE DRAWINGS

These objects and other objects and advantages of the present invention will become more apparent upon reading of the following detailed description and the accompanying drawings in which:

FIGS. 8A to 8J are diagrams showing a manufacturing process of the TFT substrate according to the first embodiment step by step;

DETAILED DESCRIPTION OF THE PREFERRED EMBODIMENTS

First Embodiment

An active matrix type liquid crystal display device according to a first embodiment of the present invention will now be explained with reference to the drawings. The active matrix type liquid crystal display device according to the first embodiment constitutes an active matrix type liquid crystal display device of an IPS (In-Plane Switching) mode which uses an electric field formed parallel to the substrate.

Figure 1:
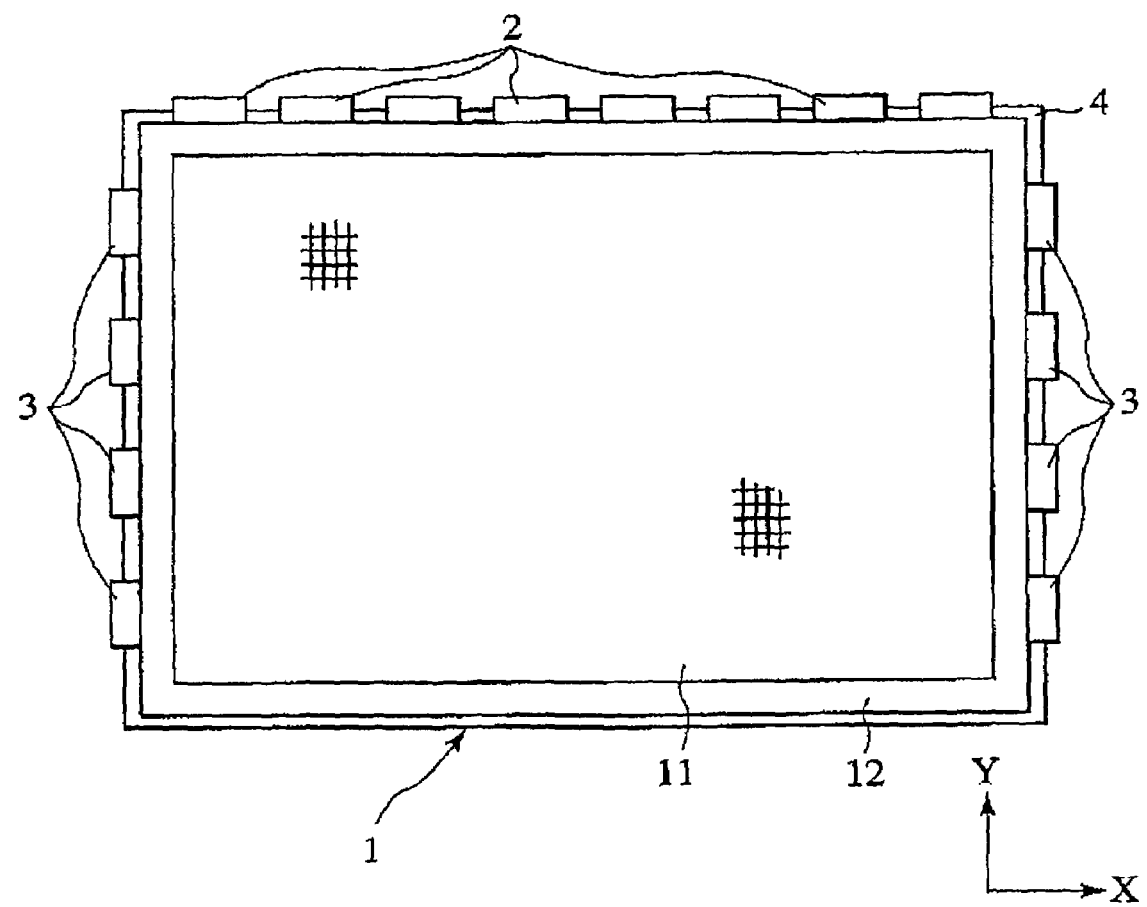
FIG. 1 shows an entire structure of an active matrix type liquid crystal display device according to a first embodiment of the present invention.
Figure 2:
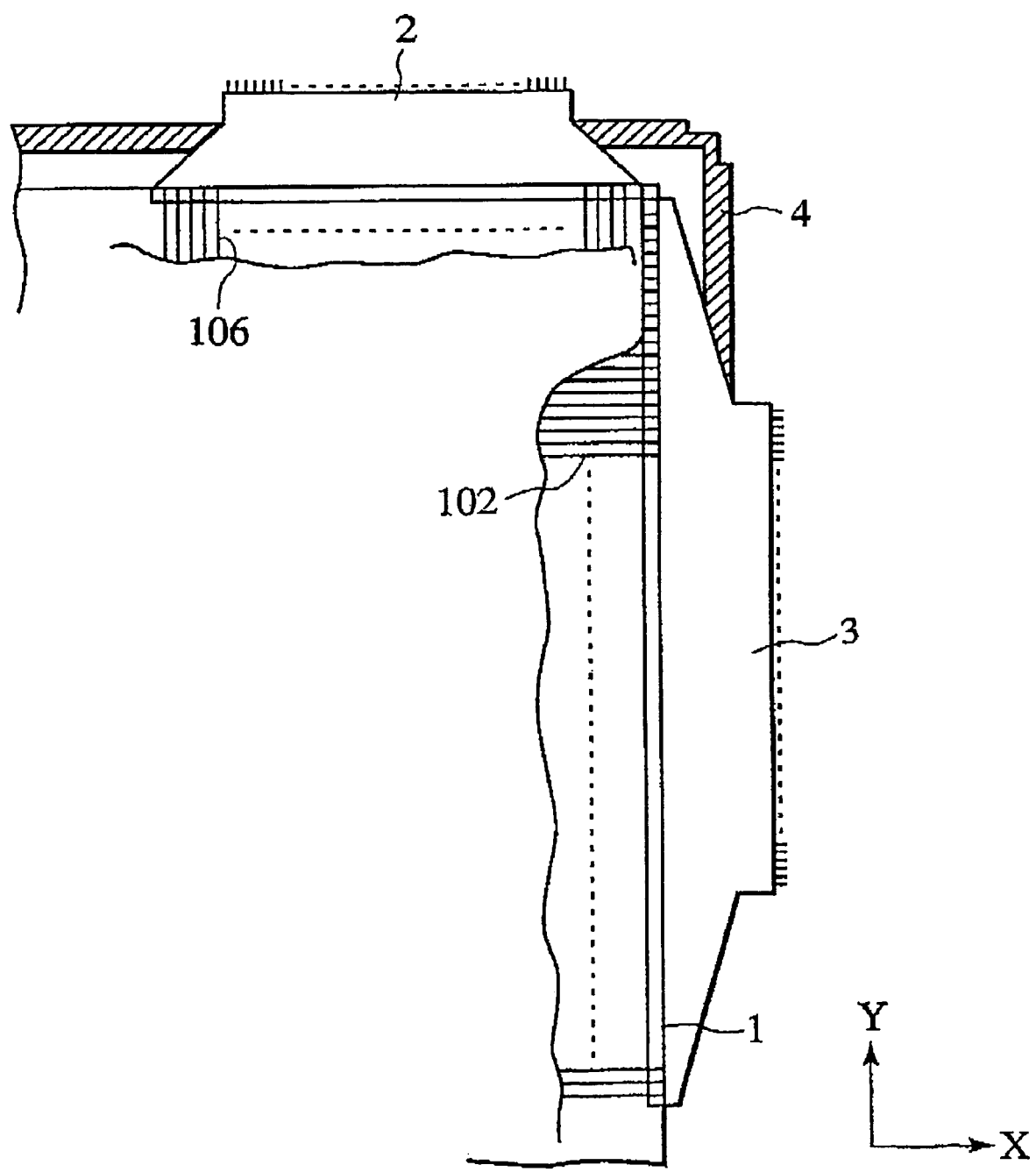
FIG. 2 shows a partially enlarged view of FIG. 1.
Figure 3:
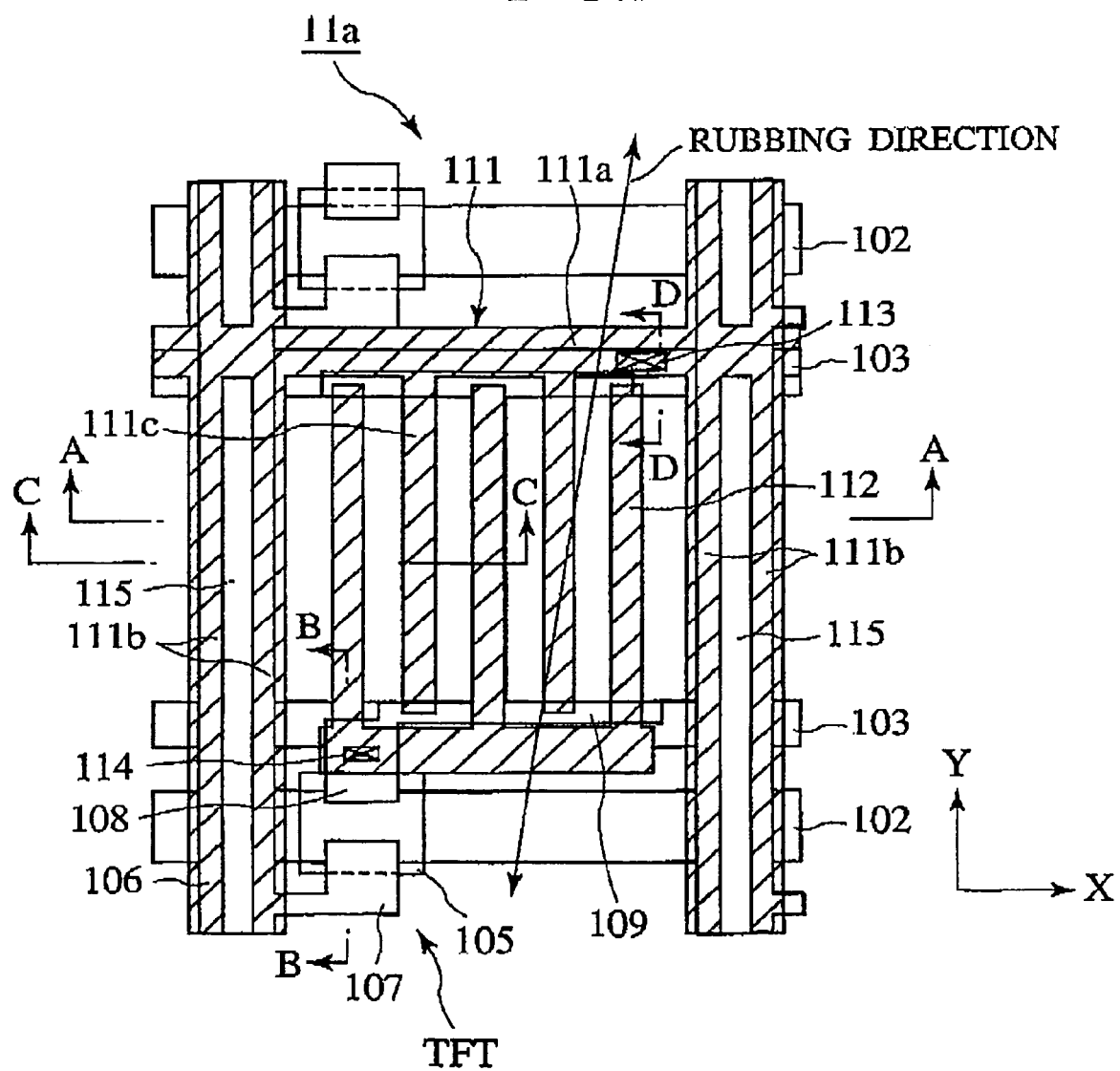
FIG. 3 shows a plan layout of a unit pixel area according to the first embodiment of the present invention.
Figure 4:
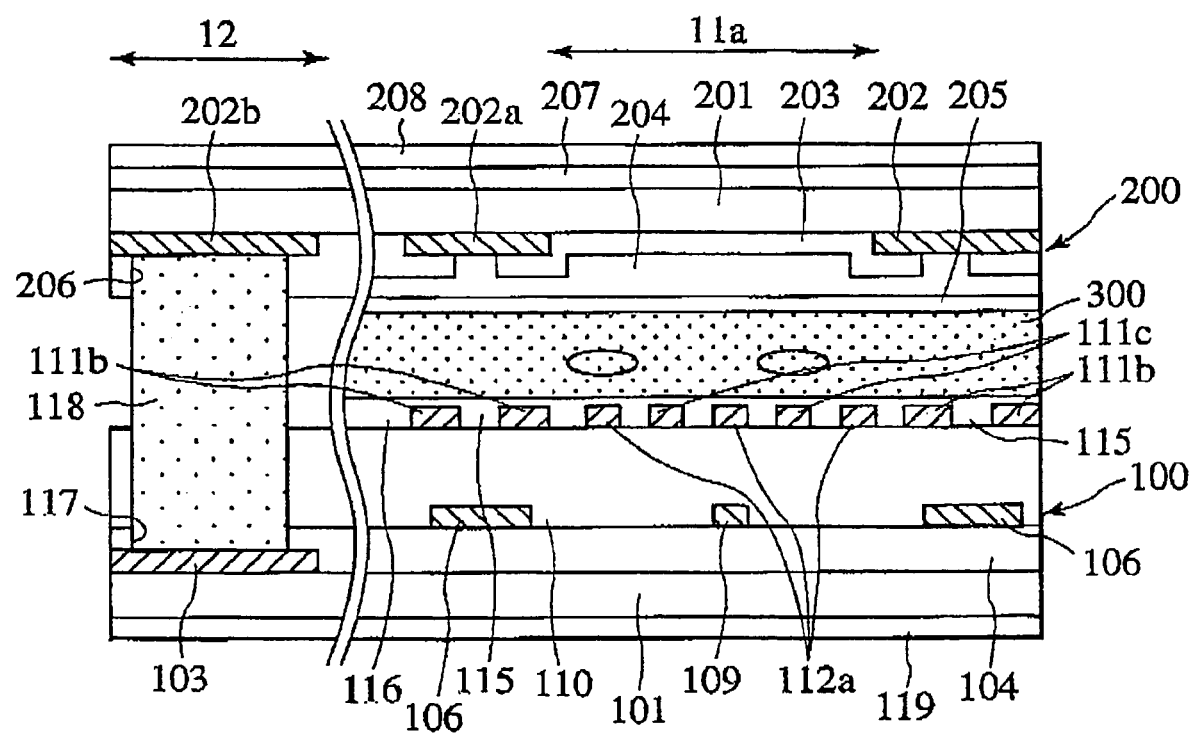
FIG. 4 is a cross sectional view of FIG. 3 when sectioned along a line AA.

FIG. 1 shows a plan layout of the whole active matrix type liquid crystal display device according to the first embodiment. FIG. 2 shows an enlarged view of an edge part of the liquid crystal display device 1 shown in FIG. 1. FIG. 3 shows a plan layout of a unit pixel of the liquid crystal display device 1 shown in FIG. 1. FIG. 4 shows a cross section of the unit pixel shown in FIG. 3 as sectioned along a direction A-A.

As shown in FIG. 1, the liquid crystal display device 1 has almost a rectangular shape. The liquid crystal display device 1 has two parts, a pixel area 11 having almost a square shape and formed almost all over the liquid crystal display device 1, and a peripheral area 12 surrounding the pixel area 11.

As will be described later, the pixel area 11 comprises a plurality of unit pixel areas arranged in a matrix. A color layer, a TFT (Thin Film Transistor) as a switching element, and the like are provided in each unit pixel area.

The peripheral area 12 forms a terminal area of the liquid crystal display device 1. Data line terminals 2, scanning line terminals 3, and a common wiring terminal 4 are provided in the peripheral area 12.

The data line terminals 2 are provided along one line (the line extending toward an X direction) of the liquid crystal display device. A plurality of data line terminals 2 are provided at regular intervals. As shown in FIG. 2, a plurality of data lines 106 are connected to each data line terminal 2. The data lines 106 extend almost vertically toward a Y direction from the line on which the data line terminals 2 are provided. A data signal applied to the data line terminals 2 is supplied to the drains of TFTs via the data lines 106, as will be described later.

As shown in FIG. 1, the scanning line terminals 3 are provided along two opposing lines (lines extending toward the Y direction) of the liquid crystal display device 1. A plurality of scanning line terminals 3 are provided at regular intervals. As shown in FIG. 2, a plurality of scanning lines 102 are connected to each scanning line terminal 3. The scanning lines 102 extend almost vertically toward the X direction from the lines on which the scanning line terminals 3 are provided. A scanning signal applied to the scanning line terminals 3 is supplied to the gates of TFTs via the scanning lines 102.

As shown in FIG. 1 and FIG. 2, the common wiring terminal 4 is provided so as to cover the circumference of the liquid crystal display device 1. A common voltage applied to the common wiring terminal 4 is supplied to a common electrode, as will be described later.

FIG. 3 shows a plan layout of a unit pixel area 11a of the liquid crystal display device 1. FIG. 4 shows a cross sectional structure of the liquid crystal display device 1. This cross section corresponds to a section of the liquid crystal display device 1 shown in FIG. 3 as sectioned along a line A-A, and also to a section of the peripheral area 12.

As shown in FIG. 4, the liquid crystal display device 1 according to this embodiment comprises a TFT substrate 100, an opposing substrate 200, and a liquid crystal 300.

The TFT substrate 100 and the opposing substrate 200 are arranged so as to oppose each other via a spacer (not illustrated). The peripheries of the TFT substrate 100 and opposing substrate 200 are connected by a sealing member (not illustrated). The liquid crystal 300 is filled in a liquid crystal cell (sealed container) formed by the TFT substrate 100, the opposing substrate 200, and the sealing member.

The TFT substrate 100 comprises a first transparent substrate 101 made of transparent glass, transparent plastic, or the like. The scanning lines 102 (not illustrated in FIG. 4), and common wirings 103 are formed on one surface of the first transparent substrate 101. The scanning lines 102 and the common wirings 103 are made of, for example, chromium, aluminum, molybdenum, tantalum, copper, aluminum-copper, aluminum-silicon-copper, titanium, or tungsten, or an opaque film such as a compound metal made of mainly those metals, or a film having a light transmittance characteristic such as ITO (Indium Tin Oxide), or a layered film of those films.

Figure 5:
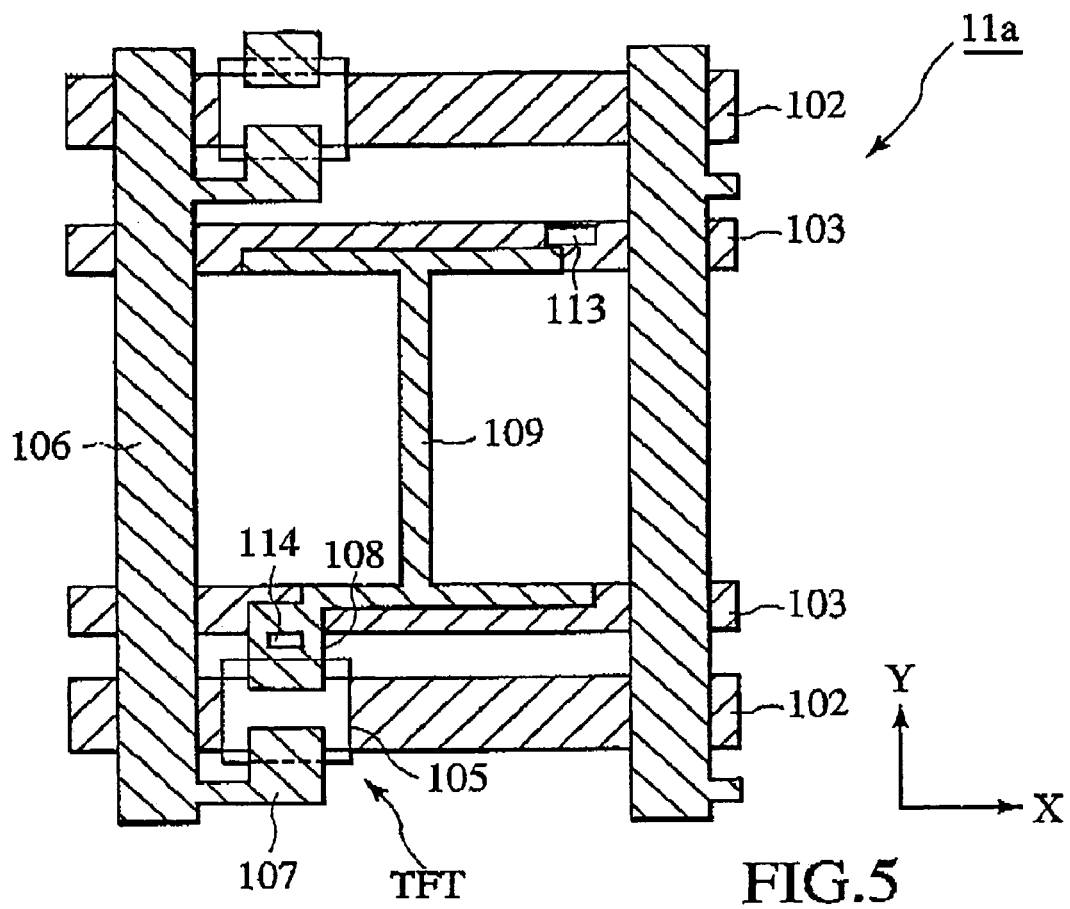
FIG. 5 is a diagram showing patterns of components included in a TFT substrate.

FIG. 5 shows patterns of the scanning lines 102 and the common wirings 103. As shown in FIG. 5, the scanning lines 102 extend toward the X direction, and determine the X direction of the unit pixel area 11a.

The common wirings 103 extend toward the X direction along the scanning lines 102. Two common wirings 103 extend between adjacent two scanning lines 102. Thus, two common wirings 103 exist in a unit pixel area 11a.

As shown in FIG. 4, a first interlayer insulation film 104 is formed on the first transparent substrate 101, the scanning lines 102, and the common wirings 103. The first interlayer insulation film 104 is made of, for example, a silicon oxide film, a silicon nitride film, or a layered film of those films.

The data lines 106 and a first pixel electrode 109 are formed on the first interlayer insulation film 104. The data lines 106 and the first pixel electrode 109 are made of, for example, chromium, aluminum, molybdenum, tantalum, copper, aluminum-copper, aluminum-silicon-copper, titanium, or tungsten, or an opaque film such as a compound metal made of mainly those metals, or a film having a light transmittance characteristic such as ITO, or a layered film of those films.

Patterns of the data lines 106 and the first pixel electrode 109 are shown in FIG. 5. As shown in FIG. 5, the data lines 106 extend toward the Y direction with having a space between them in the X direction. The data lines 106 extend toward the Y direction and determine the sides of the unit pixel area 11a in the Y direction.

The first pixel electrode 109 is formed in almost an H letter shape, and is arranged in almost the center of the unit pixel area 11a. The two opposing line portions of the first pixel electrode 109 having an H letter shape are arranged so as to overlap the common wirings 103 which go across inside the unit pixel area 11a. The center line portion of the H letter shape of the first pixel electrode 109 extend in almost the center of the unit pixel area 11a toward the Y direction along the data lines 106. Compensating capacitors are formed between the first pixel electrode 109 and the common wirings 103 which oppose each other via the first interlayer insulation film 104.

A semiconductor island 105 which constitutes a TFT is provided in the unit pixel area 11a. As shown in FIG. 5, the semiconductor island 105 is formed in a position near the junction of the scanning line 102 and the data line 106 and overlaps the scanning line 102. Although not shown in FIG. 4, the semiconductor island 105 is formed on the first interlayer insulation film 104 above the data line 106. The semiconductor island 105 is made of amorphous silicon, polysilicon, or the like. A drain area and a source area on which phosphorus or the like is doped, are formed on the surface of the semiconductor island 105.

A drain electrode 107 and a source electrode 108 are connected to the drain area and the source area of the semiconductor island 105, respectively. The drain electrode 107 is connected to the data line 106, and is formed as a metal film substantially shared with the data line 106. The source electrode 108 is connected to the first pixel electrode 109, and is formed as a metal film substantially shared with the first pixel electrode 109. The semiconductor island 105 is provided above the scanning line 102 via the first interlayer insulation film 104. The scanning line 102 acts as a gate electrode of the TFT.

In FIG. 4, a second interlayer insulation film 110 is formed on the data lines 106, the first pixel electrode 109, and the first interlayer insulation film 104. The second interlayer insulation film 110 is made of transparent resin such as acrylic resin or the like. One surface of the second interlayer insulation film 110 is flattened, thus, the second interlayer insulation film 110 act as a flattening film. The second interlayer insulation film 110 may be made of an inorganic insulation film having no flattening effect, such as a silicon oxide film, a silicon nitride film, or the like.

A common electrode 111 and a second pixel electrode 112 are formed on the second interlayer insulation film 110. The common electrode 111 and the second pixel electrode 112 are made of, for example, chromium, aluminum, molybdenum, tantalum, copper, aluminum-copper, aluminum-silicon-copper, titanium, or tungsten, or a opaque film such as a compound metal made of mainly those metals, or a film having a light transmittance characteristic such as ITO (Indium Tin Oxide), or a layered film of those films. A material having a light transmittance characteristic such as ITO or the like is preferred in order to obtain a high aperture ratio.

Figure 6:
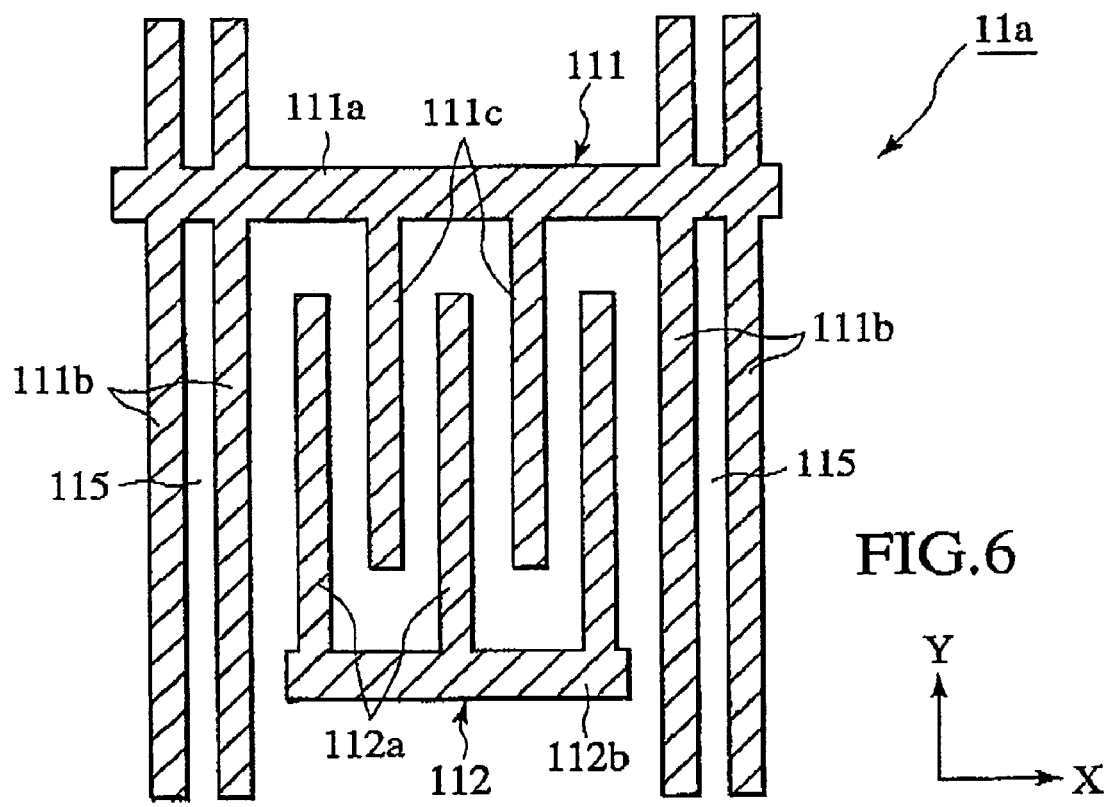
FIG. 6 is a diagram showing patterns of components included in a TFT substrate.

FIG. 6 shows patterns of the common electrode 111 and the second pixel electrode 112. As shown in FIG. 6, the common electrode 111 includes an X direction extending portion 111a, Y direction extending portions 111b, and opposing portions 111c.

The X direction extending portion 111a and Y direction extending portions 111b of the common electrode 111 extend toward the X direction and Y direction respectively, and are set almost at right angles to each other. As shown in FIG. 3, the X direction extending portion 111a is arranged so as to overlap one of the common wirings 103 that does not overlap the semiconductor island 105. That is, the X direction extending portion 111a is arranged so as to overlap the upper one of the two common wirings 103 shown in FIG. 5. The common electrode 111 is electrically connected to the common wiring 103 via a contact hole 113 for common electrode whose position is indicated in FIG. 3 and FIG. 5.

The Y direction extending portions 111b of the common electrode 111 extend toward the Y direction, and are arranged so as to overlap the data lines 106 shown in FIG. 5 along those data lines 106. The Y direction extending portions 111b have a width equal to or wider than that of the data lines 106. As will be described later, an electric field generated from the data line 106 is terminated by the Y direction extending portions 111b of the common electrode 111 via the second interlayer insulation film 110.

As shown in FIG. 6, the opposing portions 111c of the common electrode 111 are formed as linear portions which project toward the Y direction from the X direction extending portion 111a. The opposing portions 111c are formed in the unit pixel area 11a in a plural number, for example, 2. As shown in FIG. 3, the opposing portions 111c has a length in the Y direction that is almost the same as the length of the portion of the first pixel electrode 109 that is opposed to the opposing portions 111c.

The second pixel electrode 112 is arranged in almost the center of the unit pixel area 11a, and is formed in a comb shape. The second pixel electrode 112 having a comb shape includes a plurality of, for example, 3 linear opposing portions 112a extending toward the Y direction, and a linear supporting portion 112b supporting the opposing portions 112a and extending toward the X direction. The second pixel electrode 112 is arranged so that the opposing portions 112a thereof oppose the opposing portions 111c of the common electrode 111 almost in parallel with each other. As will be described later, an electric field for directing the liquid crystal molecules is generated between the opposing portions 112a of the second pixel electrode 112, and the opposing portions 111c of the common electrode 111.

As shown in FIG. 3, the second pixel electrode 112 is arranged so that a part of the second pixel electrode 112 overlaps the source electrode 108. A contact hole 114 for pixel electrode is formed in the overlapping position of the source electrode 108 and the part of the second pixel electrode 112. The second pixel electrode 112 is electrically connected to the source electrode 108 (i.e., the first pixel electrode 109) via the contact hole 114 for pixel electrode which penetrates the second interlayer insulation film 110.

The Y direction extending portions 111b of the common electrode 111 respectively have slits 115 in the center of the width. Each slit 115 is formed along almost the full length of the Y direction extending portion 111b except the crossing portion of the X direction extending portion 111a and the Y direction extending portion 11b.

In a case where the data line 106 has a width of 10 µm and the Y direction extending portion 111b has a width of 18 µm, the width of the slit 115 is set to, for example, 5 µm. In this case, the Y direction extending portion 111b has extra 4 µm widths from the both sides of the data line 106, and covers the both sides of the data line 106 symmetrically. In a case where the measures are set as above, it is preferred that the Y direction extending portion 111b has at least extra 1.5 µm widths from the both sides of the data line 106.

As shown in FIG. 4, an orientation film 116 is formed on the common electrode 111, the second pixel electrode 112, and the second interlayer insulation film 110. The orientation film 116 is made of, for example, polyimide resin. The surface of the orientation film 116 is flattened, and has been subjected to an alignment treatment such as rubbing, or the like.

In the peripheral area 12, a contact hole 117 for connecting the substrates is opened which penetrates the second interlayer insulation film 110 and the first interlayer insulation film 104. A plug 118 which electrically connects the TFT substrate with the opposing substrate 200 is embedded in the contact hole 117 for connecting the substrates. The plug 118 is made of, for example, silver paste. The plug 118 may be made of paste of other metals, etc.

A polarizing plate 119 is adhered to the other surface of the first transparent substrate 101.

The opposing substrate 200 comprises a second transparent substrate 201 made of transparent glass, transparent plastic, or the like.

A black matrix 202 is formed on one surface of the second transparent substrate 201. The black matrix 202 is made of a conductive material having a light blocking characteristic, such as chromium, carbon black, or the like.

The black matrix 202 has a function for increasing contrast between pixels. The black matrix 202 is formed in a pattern having a plurality of openings. The black matrix 202 includes portions 202a which overlap at least the data lines 106, and a portion 202b provided in the peripheral area 12.

As shown in FIG. 4, the Y direction extending portion 111b exists between the portion 202a of the black matrix 202 and the data line 106. As described above, the Y direction extending portion 111b has the slit 115. Thus, the portion 202a of the black matrix 202 and the data line 106 oppose each other via the slit 115.

The portion 202a of the black matrix 202 is formed so as to overlap the slit 115, and to have a width equal to or wider than that of the slit 115. For example, in a case where the width of the slit 115 is 5 µm as described above, the width of the portion 202a of the black matrix 202 is set to at least equal to or wider than 5 µm. As will be described later, the portion 202a of the black matrix 202 which is formed so as to barely cover the slit 115 terminates an electric field from the data line 106 that leaks through the slit 115.

A color layer 203 is formed in a part of each opening of the black matrix 202. The part corresponds to a display area. The color layer 203 is made of resin, for example, including acrylic resin in which one of three pigments, red (R), green (G), and blue (B) is dispersed.

A flattening film 204 is formed on the black matrix 202, the color layer 203, and the second transparent substrate 201. The flattening film 204 is made of transparent resin such as acrylic resin or the like. The surface of the flattening film 204 is flattened.

An orientation film 205 is formed on the flattening film 204. The orientation film 205 is made of, for example, imide resin. The surface of the orientation film 205 is flattened, and has been subjected to an alignment treatment such as rubbing or the like.

Another portion of the black matrix 202 (i.e., the portion 202b) is formed in the peripheral area 12 of the opposing substrate 200. A contact hole 206 for connecting the substrates is formed in the flattening film 204. The portion 202b of the black matrix 202 is exposed to the bottom of the contact hole 206 for connecting the substrates. It should be noticed that the orientation film 205 is not provided in the peripheral area 12.

The contact hole 206 for connecting the substrates is provided so as to oppose the contact hole 117 for connecting the substrates which is provided in the TFT substrate 100. The same plug 118 is embedded in the contact hole 206 for connecting the substrates. Thus, the common wiring 103 of the TFT substrate 100 and the black matrix 202 of the opposing substrate 200 are electrically connected to each other, and can be set to the same electric potential.

A conductive layer 207 made of ITO or the like and having a light transmittance characteristic is formed on the other surface of the second transparent substrate 201. A polarizing plate 208 is adhered onto the conductive layer 207.

A display operation of the liquid crystal display device 1 having the above-explained structure will be explained below. In order to drive the liquid crystal display device 1, a driver circuit (not illustrated) applies a gate pulse to the scanning lines 102 sequentially, and applies a data signal having a voltage corresponding to a display tone to the data line 106 almost synchronously with the gate pulse. A TFT which is connected to a scanning line 102 to which the gate pulse is applied (i.e., a scanning line 102 which is selected) is turned on, and the voltage applied to the data line 106 at this time is applied to the second pixel electrode 112 via the drain electrode 107, the semiconductor island 105, the source electrode 108, and the contact hole 114 for pixel electrode.

When the gate pulse is cut off, the TFT is turned off. And the voltage that has been applied to the second pixel electrode 112 till that time is stored in capacitors (pixel electrodes) between the second pixel electrode 112 and the common electrode 111, and in the compensating capacitors between the first pixel electrode 109 and the common wirings 103.

Therefore, the voltage which corresponds to the display tone is applied to the liquid crystal 300 in each unit pixel area 11a until the next selection period. At this time, electric fields parallel to the substrate are formed between the opposing portions 112a of the second pixel electrode 112, and the Y direction extending portions 111b and opposing portions 111c of the common electrode 111. The liquid crystal 300 is oriented in a desired state by those parallel electric fields, and the color of the color layer 203 is displayed in a desired tone.

Figure 7:
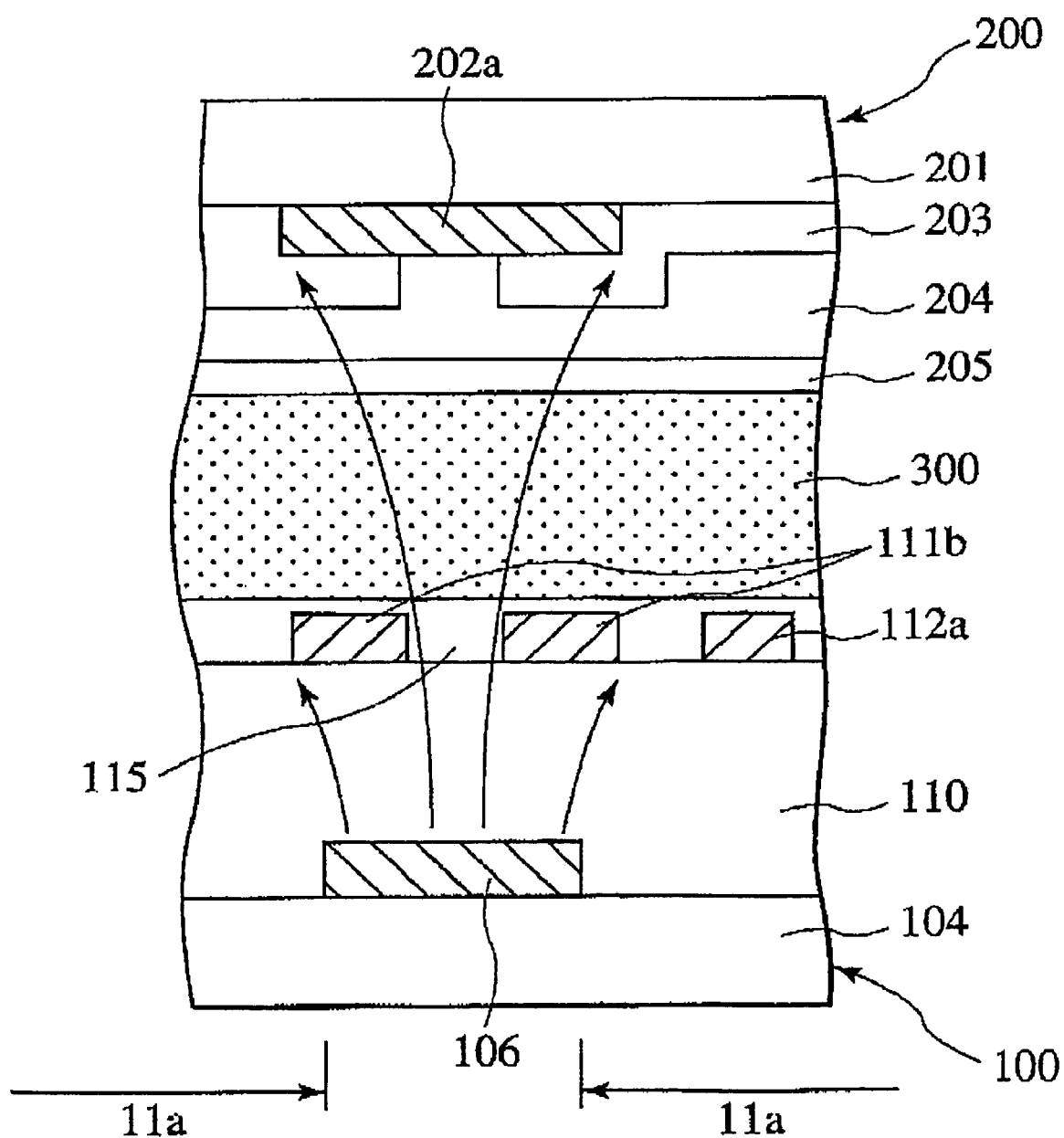
FIG. 7 is a diagram schematically showing an electric field above a data line.

An electric field which is formed near the data line 106 at the time of the above-described display operation is schematically shown in FIG. 7. The electric field generated from the data line 106 is terminated at the Y direction extending portion 111b of the common electrode 111 provided above the data line 106. Since the Y direction extending portion 111b has a width almost equal to or greater than that of the data line 106, the electric field generated from the data line 106 is mostly terminated by the Y direction extending portion 111b. Accordingly, leakage of the electric field to the liquid crystal 300 in the unit pixel areas 11a that are located above both sides of the data line 106 is prevented. Thus, occurrence of a defect in the displayed image due to the leak electric field is prevented.

The slit 115 is formed in the Y direction extending portion 111b. Thus, the opposing area of the data line 106 and the Y direction extending portion 111b is reduced by the area of the opening formed by the slit 115. Accordingly, electrostatic capacitance stored between the data line 106 and the Y direction extending portion 111b can be suppressed to a relatively low level, and signal delay can be reduced.

Part of the electric field generated from the data line 106 leaks through the slit 115 to the liquid crystal 300 above the slit 115. However, the portion 202a of the black matrix 202 is formed in the opposing substrate 200 so as to oppose the data line 106. As described above, the black matrix 202 is connected to the common wiring 103 by the plug 118 in the peripheral area 12, and is set to have the common electric potential as that of the common wiring 103. The electric field leaking out through the slit 115 is terminated by the portion 202a of the black matrix 202 which is provided right above the slit 115.

The portion 202a of the black matrix 202 has a width equal to or wider than that of the slit 115. Thus, the electric field which leaks through the slit 115 is mostly terminated by the portion 202a of the black matrix 202.

As described above, according to the first embodiment, the electric field caused from the data line 106 is terminated by the Y direction extending portion 111b of the common electrode 111 which is provided so as to oppose the data line 106 via the insulation film. The Y direction extending portion 11b is formed to have a width equal to or wider than that of the data line 106, and thus leakage of the electric filed to the liquid crystal 300 is sufficiently prevented.

The Y direction extending portion 111b has the slit 115. Thus, the opposing area of the Y direction extending portion 111b and the data line 106 is relatively small, and therefore, electrostatic capacitance stored between the Y direction extending portion 111b and the data line 106 can be suppressed to a relatively low level. Accordingly, signal delay due to the electrostatic capacitance can be relatively reduced.

This reduction in the electrostatic capacitance is achieved by providing the slit 115 in the common electrode 111. Accordingly, it is unnecessary to employ the relatively thin second interlayer insulation film 110, and it is possible to avoid increase in a possibility of an interlayer short circuit due to a pinhole opened in the second interlayer insulation film 110.

The Y direction extending portion 111b is formed to have almost the same width as that of the data line 106. Thus, even in case where the common electrode 111 is made of an opaque material such as chromium or the like, it is possible to prevent leakage of an electric filed and to reduce signal delay without substantially reducing the aperture ratio.

Further, the electric field that leaks through the slit 115 is terminated by the portion 202a of the black matrix 202 which is provided above the slit 115 and set to the common electric potential as that of the common wiring 103 and the common electrode 111. Accordingly, it is possible to sufficiently prevent leakage of the electric field with reducing electrostatic capacitance.

Still further, such a structure of the liquid crystal display device 1 as described above can be manufactured by only modification of an ordinary manufacturing process such as change of an etching pattern of the common electrode 111 except embedding of the plug 118, and requires no large increase in the number of manufacturing steps and manufacturing costs.

A method of manufacturing the liquid crystal display device having the above structure will now be explained below with reference to the drawings. FIGS. 8A to 8J show manufacturing steps of the TFT substrate 100. FIGS. 8A to 8J show cross sections of liquid crystal display device 1 shown in FIG. 3 as sectioned along a direction BB, a direction CC, and a direction DD, and cross sectional structures for each area in which the contact hole 117 for connecting the substrates, the data line terminal 2, or the scanning line terminal 3 is to be formed step by step.

The manufacturing method to be described below is just for an example, and any other method that can achieve the same result is employable. And materials to be used are not limited to those which will be described below.

First, as shown in FIG. 8A, a first metal film 131 made of chromium or the like is formed on one surface of the first transparent substrate 101 by sputtering, for example. Then, as shown in FIG. 8B, the scanning lines 102, the common wirings 103, etc. are formed by patterning the first metal film 131 by a photolithography technique.

Then, as shown in FIG. 8C, a silicon oxide film 132 is formed on the first transparent substrate 101 by a CVD method, for example. Further, a silicon nitride film 133 is formed on the silicon oxide film 132 by a plasma CVD method, for example the silicon oxide film 132 and the silicon nitride film 133 constitute the first interlayer insulation film 104.

Then, an amorphous silicon layer 134 and an $n^+$ type doped silicon layer 135 are sequentially formed on the silicon nitride film 133 by a plasma CVD method, for example. And as shown in FIG. 8D, the semiconductor island 105 is formed by patterning the amorphous silicon layer 134 and the $n^+$ type doped silicon layer 135 using a photolithography technique. The $n^+$ type doped silicon layer 135 may be formed by implanting phosphorus or the like into the amorphous silicon layer 134 by sputtering or the like.

Figure 8E:
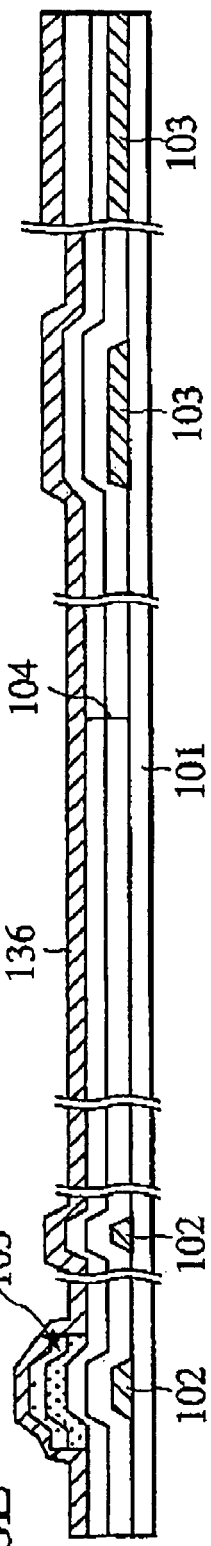
Figure 8F:
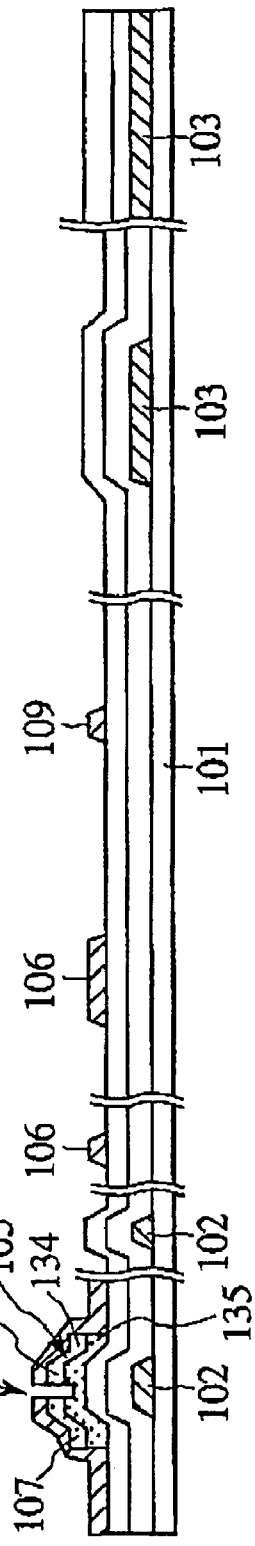

Then, as shown in FIG. 8E, a second metal film 136 made of chromium or the like is formed on the substrate by sputtering, for example. And as shown in FIG. 8F, the data lines 106, the drain electrode 107, the first pixel electrode 109, and the source electrode 108 are formed by patterning the second chromium film 136 by a photolithography technique.

Further, the $n^+$ type doped silicon layer 135 between the drain electrode 107 and the source electrode 108 is selectively etched to form a groove which goes to the amorphous silicon layer 134. Thus, a drain and source area is formed in the $n^+$ type doped silicon layer 135, and a TFT whose channel is the amorphous silicon layer 134 and whose ohmic layer is the $n^+$ type doped silicon layer 135 is formed.

Figure 8G:
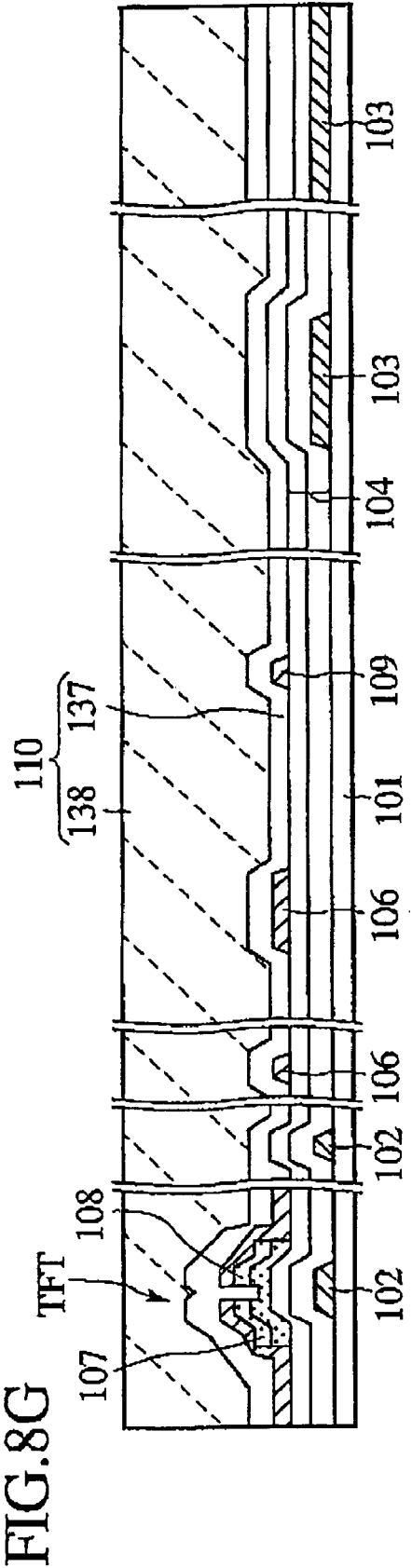

Next, as shown in FIG. 8G, a silicon nitride film 137 is formed on the substrate by a plasma CVD method, for example. Then, an organic film 138 made of, for example, acrylic resin is formed on the silicon nitride film 137 by spin coating to form the plane second interlayer insulation film 110. The silicon nitride film 137 and the organic film 138 constitute the second interlayer insulation film 110.

Then, an opening is formed by etching the organic film 138. Then, openings are formed by etching the silicon nitride film 137, the silicon nitride film 133, and the silicon oxide film 132. The organic film 138 is etched so as to form the opening having a tapered shape. The silicon nitride film 137 and the like are etched so as to expose the metal film in the openings.

Figure 8H:
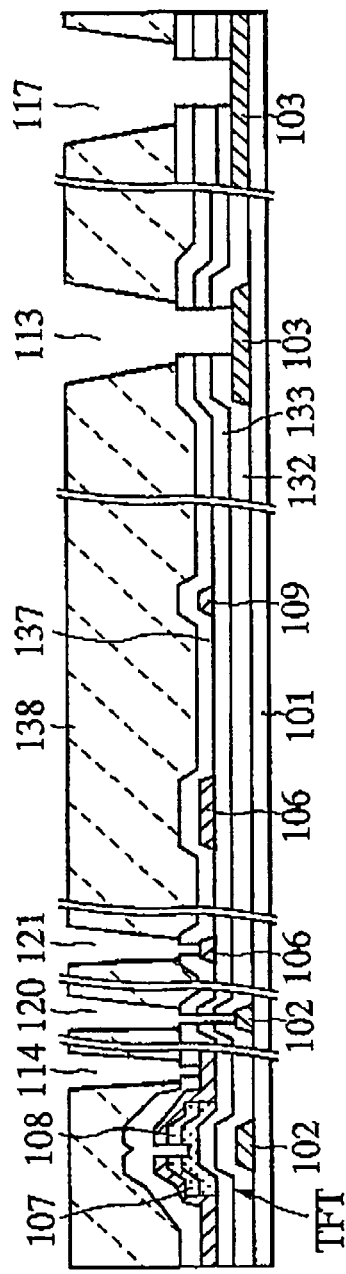

As shown in FIG. 8H, the contact hole 113 for common electrode, the contact hole 114 for pixel electrode, the contact hole 117 for connecting the substrates, a contact hole 120 for data line, and a contact hole 121 for scanning line are formed by the etching.

Figure 8I:
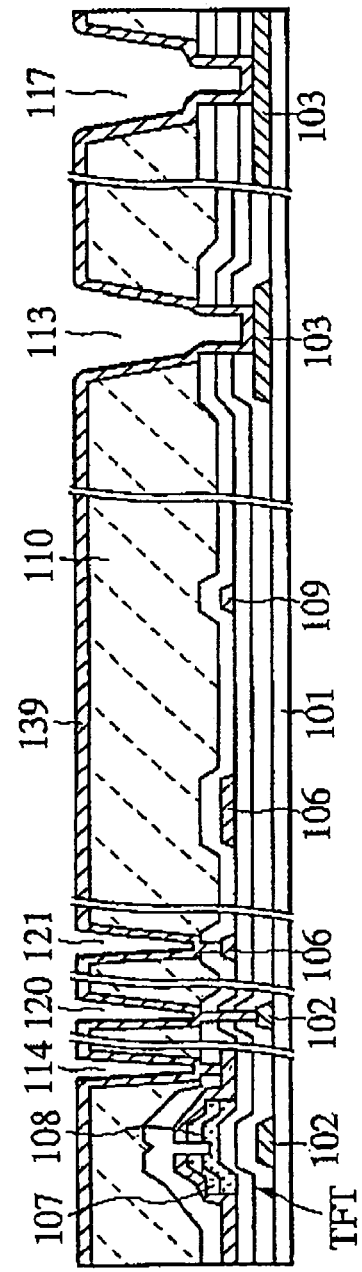
Figure 8J:
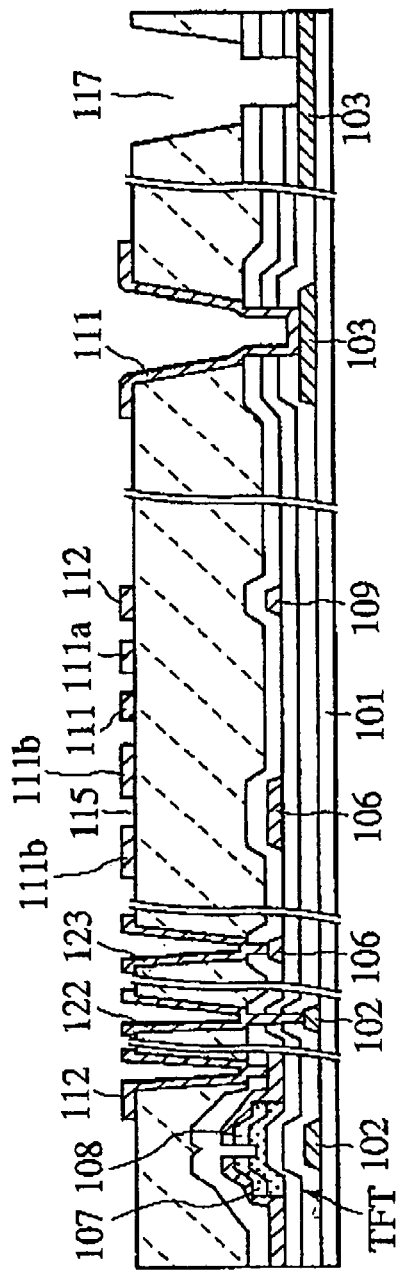

Then, as shown in FIG. 8I, a third metal film 139 made of ITO or the like is formed on the substrate by sputtering, for example. Thereafter, the third metal film 139 is patterned by a photolithography technique to form the common electrode 111 and the second pixel electrode 112 having the formations shown in FIG. 8J and FIG. 6. At this time, the common electrode 111 having the slits 115 is formed.

After the etching, the third metal film 139 in the contact hole 117 for connecting the substrates is removed, thus, the common wiring 103 is exposed at the bottom of the contact hole 117. An electrode 122 and an electrode 123 formed in the contact hole 120 for data line and in the contact hole 121 for scanning line respectively form a data line terminal 2 and a scanning line terminal 3.

Thereafter, as shown in FIG. 4, the orientation film 116 made of imide resin or the like is formed on the substrate except the peripheral area 12. Afterwards, the surface of the orientation film 116 is rubbed for an alignment treatment. Thus, the TFT substrate 100 is completed.

The opposing substrate 200 is formed as will be described below. A light blocking conductive film made of chromium, carbon black, or the like is formed on one surface of the second transparent substrate 201. And the conductive film is patterned in a predetermined shape. By the patterning, the black matrix 202 is formed. At this time, as described above, the portions 202a of the black matrix 202 shown in FIG. 4 that have a predetermined width are formed.

Then, a resin layer made of photosensitive resin or the like is formed on the substrate. Then, the color layer 203 for covering the openings of the black matrix 202 is formed by patterning the resin layer.

Thereafter, the flattening film 204 made of acrylic resin or the like is formed on the substrate. Then, the contact hole 206 for connecting the substrates is formed by etching the flattening film 204.

Then, the orientation film 205 made of imide resin or the like is formed on the flattening film 204. The surface of the orientation film 205 is rubbed for an alignment treatment. The rubbing direction is opposite to the direction of rubbing applied to the TFT substrate 100. Thus, the opposing substrate 200 is completed.

Thus formed TFT substrate 100 and opposing substrate 200 are integrated via a spacer and sealing member (both not illustrated) so that the respective orientation films 116 and 205 face each other. Then, the liquid crystal 300 is filled in a space (cell) between the two substrates formed by the sealing member, and the cell is sealed. Finally, polarizing plates 119 and 208 are adhered onto the other surface of the first transparent substrate 101 and the other surface of the second transparent substrate 201, respectively.

Before integrating the TFT substrate 100 and the opposing substrate 200, silver paste is filled in the contact hole 117 for connecting the substrates so as to overflow therefrom. When the TFT substrate 100 and the opposing substrate 200 are integrated, the top of the silver paste moves and is filled in the contact hole 206 for connecting the substrates which is formed in the opposing substrate 200. Thus, the plug 118 for electrically connecting the common wiring 103 and the black matrix 202 is formed. The liquid crystal display device 1 according to the first embodiment is thus completed.

Figure 9:
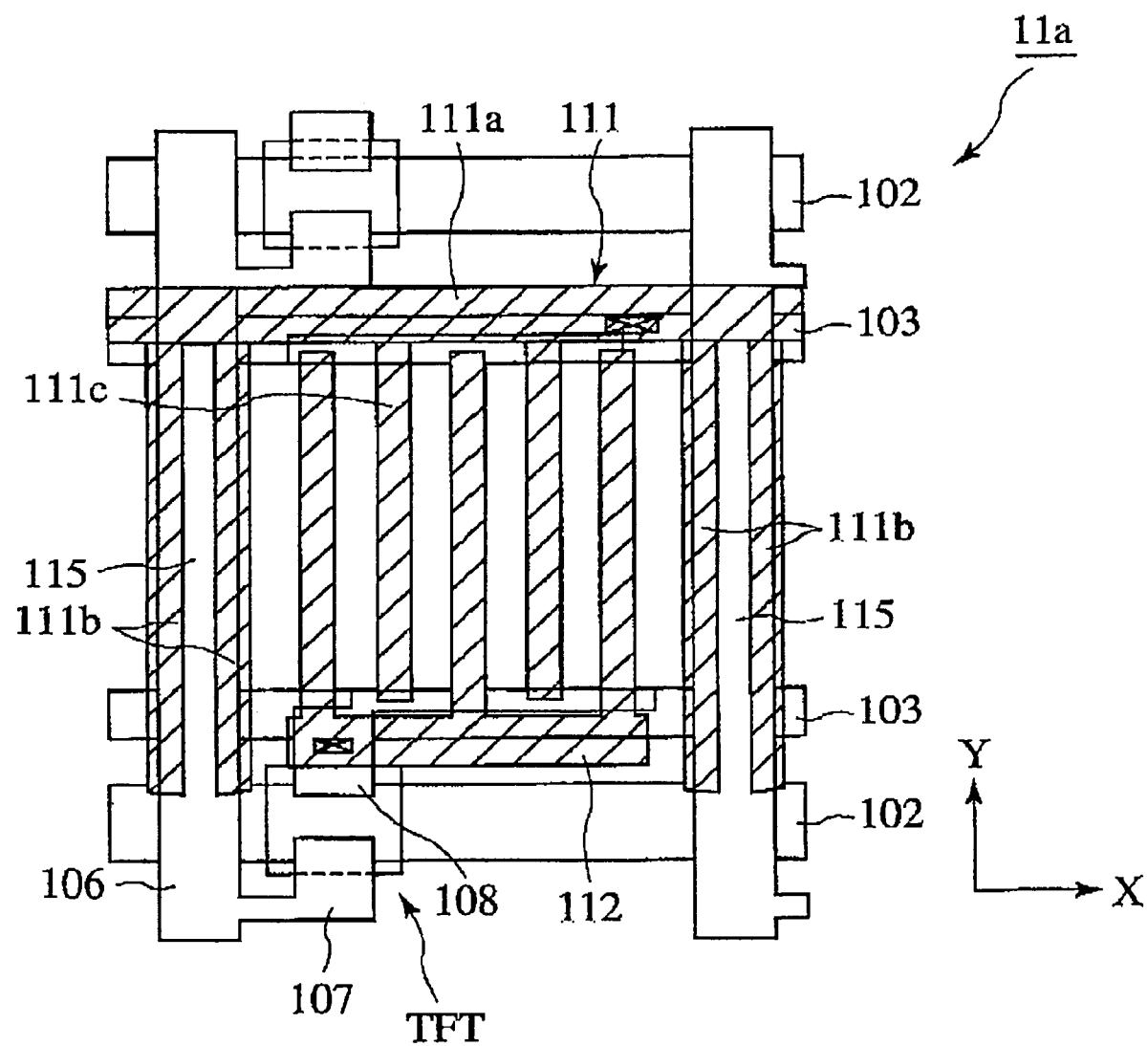
FIG. 9 is a plan layout of a TFT substrate according to a modification of the first embodiment.

According to the above-described first embodiment, the Y direction extending portions 111b of the common electrode 111 prevent leakage of an electric field to the liquid crystal 300 in the unit pixel area 11a. Accordingly, the Y direction extending portions 111b need only to be provided along the side lines of the unit pixel area 11a, and do not have to extend over a plurality of unit pixel areas continuously in the Y direction. Thus, the common electrode 111 may be consecutive in the X direction, while the Y direction extending portions 111b may be separated in the Y direction by each of the unit pixel areas, as shown in FIG. 9.

Second Embodiment

Figure 10:
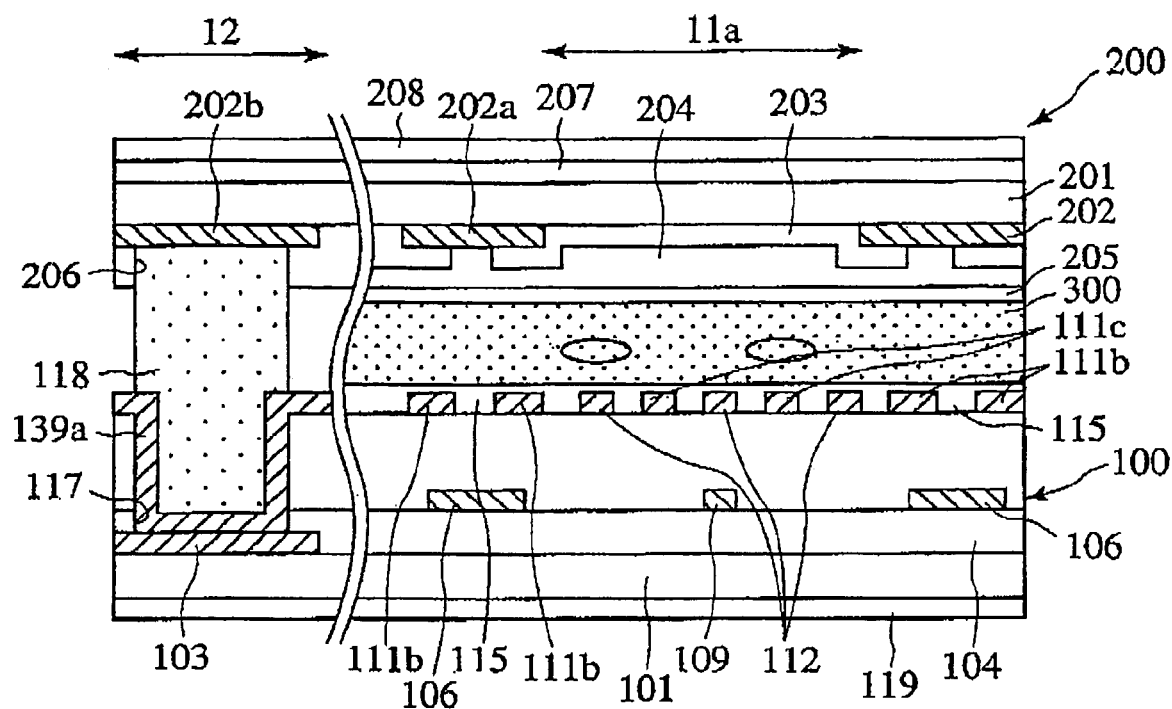
FIG. 10 shows a cross section of an active matrix type liquid crystal display device according to a second embodiment of the present invention.

FIG. 10 shows a structure of a liquid crystal display device according to a second embodiment of the present invention. The plan layout of a unit pixel area of the liquid crystal display device according to the second embodiment is identical to the plan layout of the unit pixel area of the first embodiment shown in FIG. 3. Thus, illustration of the plan layout is omitted, and a cross section of the unit pixel area as sectioned along a line corresponding to the line AA of FIG. 3 is shown in FIG. 10. Components identical to those shown in FIG. 3 and FIG. 4 are given the same reference numerals in FIG. 10, and explanation for those components will be omitted.

As shown in FIG. 10, according to the second embodiment, a connection film 139a is formed on the internal wall of the contact hole 117 for connecting the substrates which is formed in the TFT substrate 100, and on the surface of the common wiring 103 which is exposed at the bottom of the contact hole 117. The connection film 139a is made of substantially the same material as that of the common electrode 111, the pixel electrode 112, etc., made of ITO or the like. That is, the connection film 139a is formed as the third metal film 139 in the step shown in FIG. 8I, and remains in the contact hole 117 in the etching step shown in FIG. 8J (i.e., not etched in the etching step).

The silver paste which constitutes the plug 118 is provided on the connection film 139a. Thus, the plug 118 is connected to the common wiring 103 via the connection film 139a. In a case where the common wiring 103 is made of a material which is easily oxidized such as chromium or the like, the connection film 139a is provided to compensate for the deterioration of connection between the silver paste and the common wiring 103.

This structure is effective particularly in a case where the common electrode 111, the second pixel electrode 112, etc. are made of ITO. With reluctantly oxidized ITO on the common wiring 103 which is exposed in the contact hole 117, deterioration of connection between the silver paste and the common wiring 103 is compensated for. Due to this, a voltage drop in the common electric potential between the common wiring 103 and the black matrix 202 is prevented, and protection against leakage of an electric field is improved.

The second embodiment shown in FIG. 10 also suggests an example in which the portion 202a of the black matrix 202 has a width smaller than that of the portion 202a according to the first embodiment.

As described above, the portion 202a of the black matrix 202 needs only to have a width enough to cover the slit 115 of the Y direction extending portion 111b of the common electrode 111. In the structure shown in FIG. 10, the portion 202a of the black matrix 202 has a width almost the same as that of the data line 106. Thus, the width of the portion 202*a* of the black matrix 202 can be reduced with respect to the unit pixel area, and thereby the aperture ratio can be improved.

Third Embodiment

Figure 11:
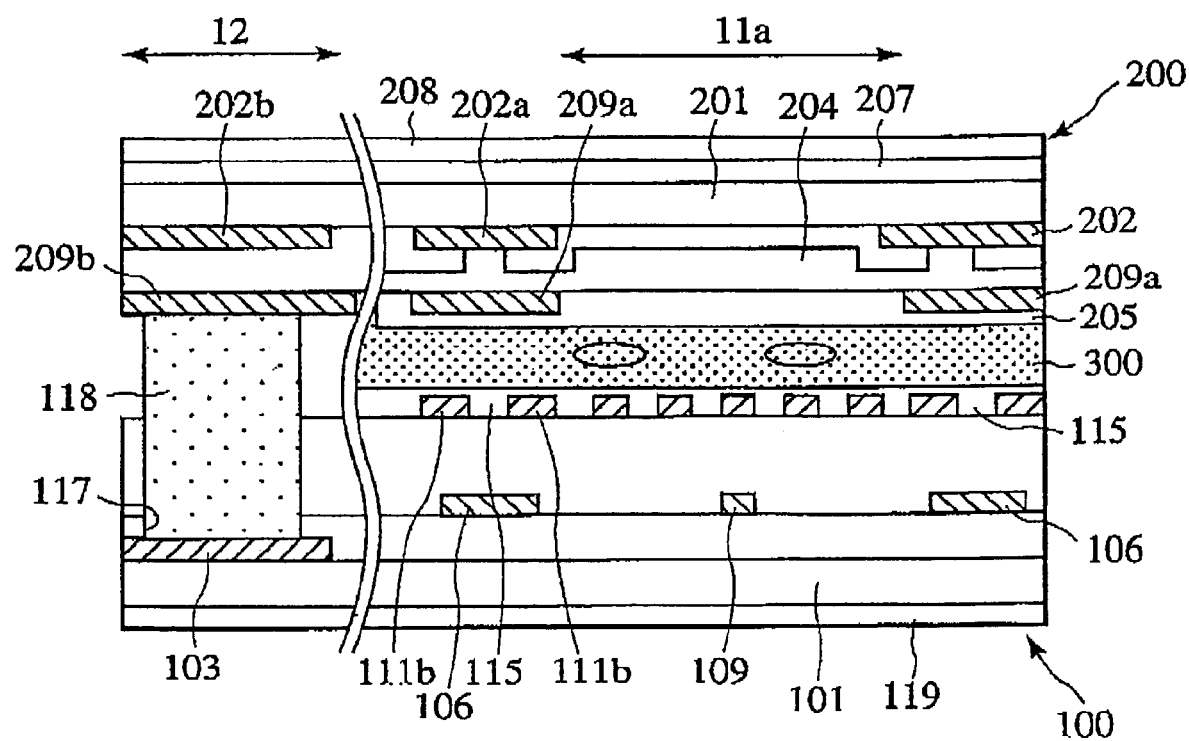
FIG. 11 shows a cross section of an active matrix type liquid crystal display device according to a third embodiment of the present invention.

FIG. 11 shows a structure of a liquid crystal display device according to a third embodiment of the present invention. The plan layout of a unit pixel area of the liquid crystal display device according to the third embodiment is identical to the plan layout of the unit pixel area of the first embodiment shown in FIG. 3. Thus, illustration of the plan layout is omitted, and a cross section of the unit pixel area as sectioned along a line corresponding to the line AA of FIG. 3 is shown in FIG. 11. Components identical to those shown in FIG. 3 and FIG. 4 are given the same reference numerals in FIG. 11, and explanation for those components will be omitted.

According to the third embodiment, a conductive film for terminating an electric field which leaks through the slit 115 is provided, aside from the black matrix 202.

As shown in FIG. 11, a conductive film 209 is formed on the flattening film 204 of the opposing substrate 200. The conductive film 209 is made of, for example, chromium, aluminum, molybdenum, tantalum, copper, aluminum-copper, aluminum-silicon-copper, titanium, or tungsten, or an opaque film such as a compound metal made of mainly those metals, or a film having a light transmittance characteristic such as ITO (Indium Tin Oxide), or a layered film of those films. The conductive film 209 is covered by the orientation film 205.

The conductive film 209 is formed by patterning with using a mask which is used for patterning the black matrix 202, or using a mask having almost the same pattern as this. Thus, the conductive film 209 includes portions 209*a* and a portion 209*b* which respectively overlap the portions 202*a* and portion 202*b* of the black matrix 202.

The portion 209*a* of the conductive film 209 is provided between the Y direction extending portion 111*b* of the common electrode 111 and the portion 202*a* of the black matrix 202, and opposes the data line 106 via the slit 115.

The portion 202*b* of the conductive film 209 is provided so as to oppose the common wiring 103 in the peripheral area 12. In the liquid crystal display device according to the third embodiment, the contact hole 206 for connecting the substrates is not provided in the flattening film 204. The portion 209*b* of the conductive film 209 is electrically connected to the common wiring 103 by the plug 118. Thus, the conductive film 209 is set to have the common electric potential as that of the common wiring 103.

The portion 209*a* of the conductive film 209 terminates an electric field which leaks through the slit 115, instead of the portion 202*a* of the black matrix 202 according to the first embodiment.

The structure having the conductive film 209 for terminating a leak electric field has the following advantages. First, there is no limit on materials to be used as the black matrix 202. For example, since there is no need of connecting the black matrix 202 to the common wiring 103 via the plug 118, carbon black, which has a poor connection characteristics with metals, and high resistance, but has a high light blocking effect, can be used for the black matrix 202.

In contrast, since the light blocking characteristics is not required to the conductive film 209, the conductive film 209 can be made of a material having low resistance and good connection characteristics. Accordingly, the possibility of a voltage drop in the common electric potential of the conductive film 209 can be reduced, and thus a shield effect against a leak electric field can be improved.

According to the third embodiment, the conductive film 209 is formed with using the same pattern as that of the black matrix 202. However, this is not the limitation for the conductive film 209. The conductive film 209 and the black matrix 202 may be formed by different patterns from each other. For example, the conductive film 209 may be made of a transparent material such as ITO, and the portion 209*a* may be formed to have a wider width than that of the portion 202*a* of the black matrix 202. In this case, the width of the portion 209*a* of the conductive film 209 can be appropriately set so that an optimum shield effect against a leak electric field can be obtained with no consideration for the width of the portion 202*a* of the black matrix 202. And in a case where the portion 209*a* of the conductive film 209 is narrower than the portion 202*a* of the black matrix 202, the portion 209*a* of the conductive film 209 can be made of an opaque material having low resistance. In either case, reduction in the aperture ratio can be prevented.

Figure 18:
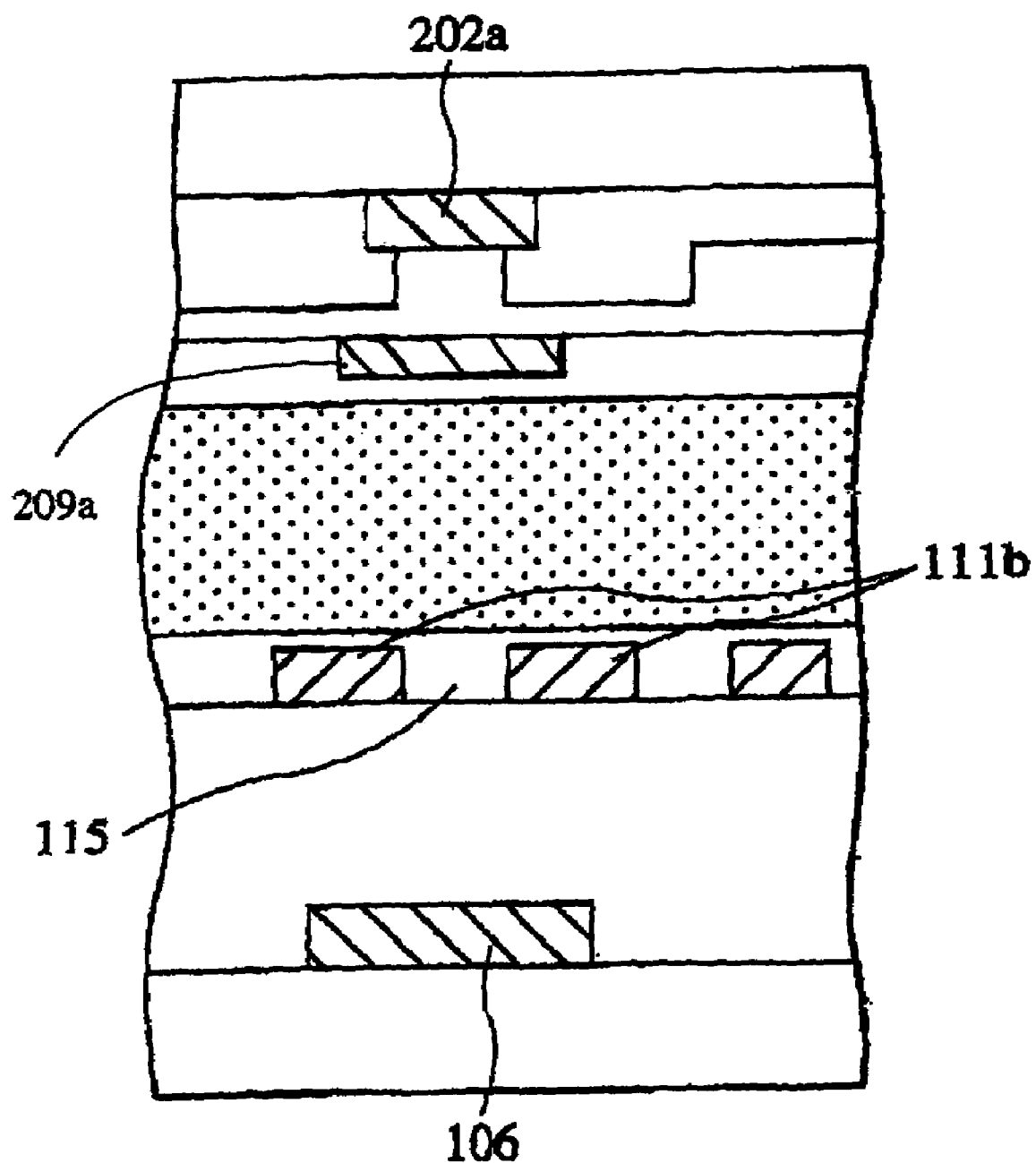
FIG. 18 shows a cross-section of an active matrix type liquid crystal display device according to an embodiment of the present invention.

FIG. 18 shows a cross-section of an active matrix type liquid crystal display device in accordance with an embodiment of the present invention. Components similar to those shown in FIG. 4 and FIG. 11 are given the same reference numerals in FIG. 18. The embodiment shown in FIG. 18 is an example in which a portion 202*a* of a black matrix is located opposite a data line 106 and has a width that is less than a width of the data line 106 and that is at least slightly larger than a width of a slit 115 in a portion 111*b* of a common electrode that is overlapping the data line 106. The embodiment shown in FIG. 18 is also an example in which a portion 209*a* of a conductive film has a width that is at least larger than a width of the portion 202*a* of the black matrix.

Fourth Embodiment

Figure 12:
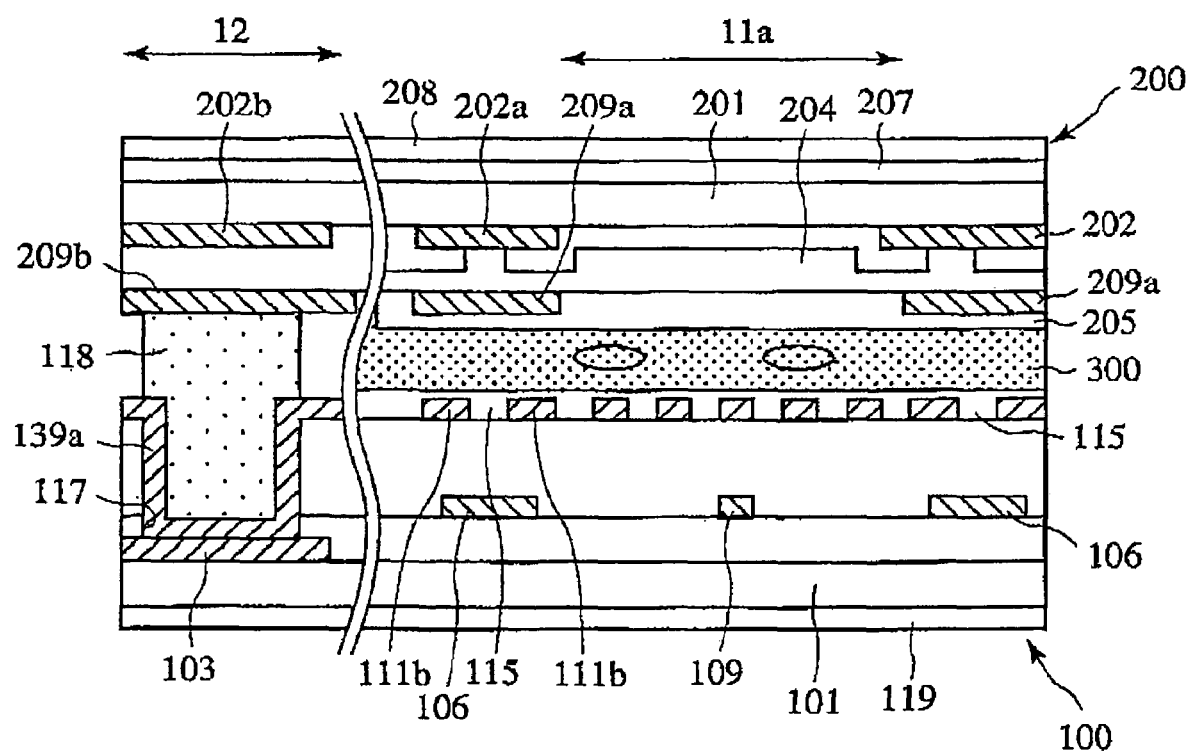
FIG. 12 shows a cross section of an active matrix type liquid crystal display device according to a fourth embodiment of the present invention.

FIG. 12 shows a structure of a liquid crystal display device according to a fourth embodiment of the present invention. The plan layout of a unit pixel area of the liquid crystal display device according to the fourth embodiment is identical to the plan layout of the unit pixel area of the first embodiment shown in FIG. 3. Thus, illustration of the plan layout is omitted, and a cross section of the unit pixel area as sectioned along a line corresponding to the line AA of FIG. 3 is shown in FIG. 12. Components identical to those shown in FIG. 3, FIG. 4, FIG. 10, and FIG. 11 are given the same reference numerals in FIG. 12, and explanation for those components will be omitted.

As shown in FIG. 12, the liquid crystal display device according to the fourth embodiment has a connection film 139*a* similar to that of the second embodiment, and a conductive film 209 similar to that of the third embodiment.

With such a structure of the liquid crystal display device, effects similar to those accomplished in the second and third embodiments can be obtained. That is, connection between the plug 118 and the common wiring 103 is enhanced, and a possibility of occurrence of a voltage drop can be reduced. And prevention against leakage of an electric field can be improved.

Fifth Embodiment

Figure 13:
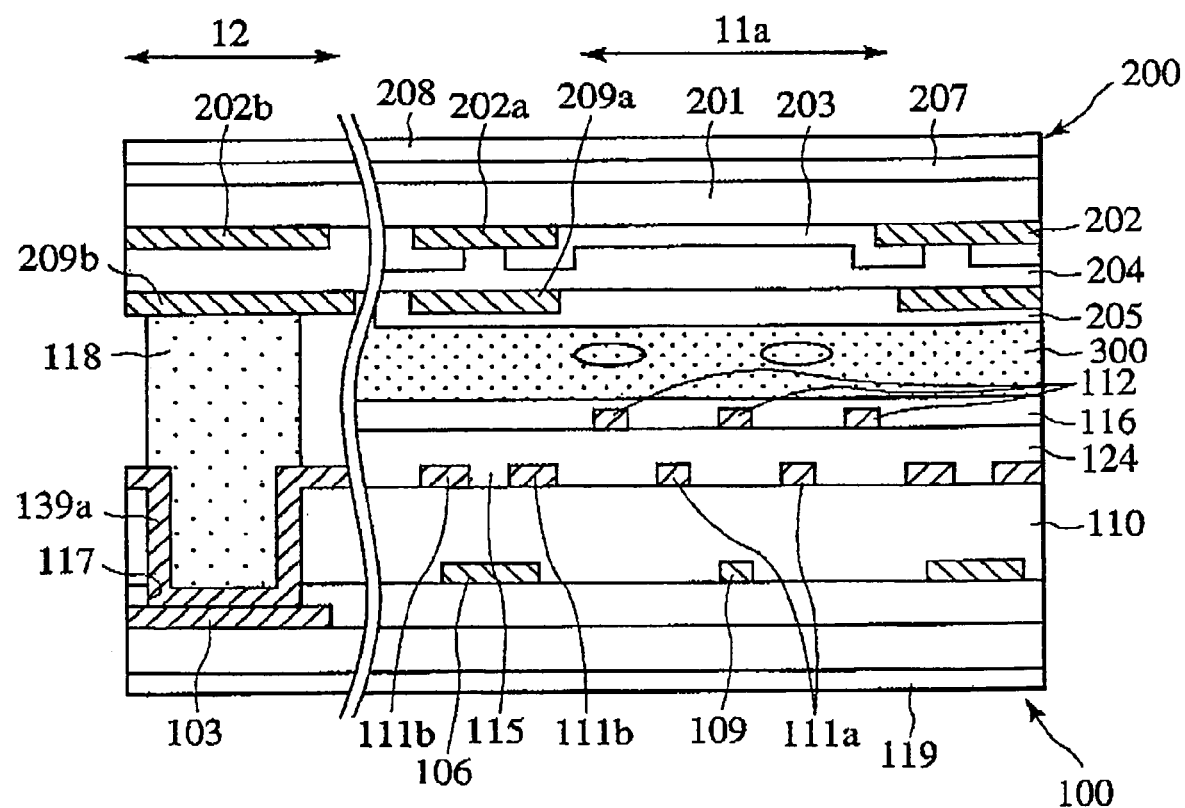
FIG. 13 shows a cross section of an active matrix type liquid crystal display device according to a fifth embodiment of the present invention.
Figure 14:
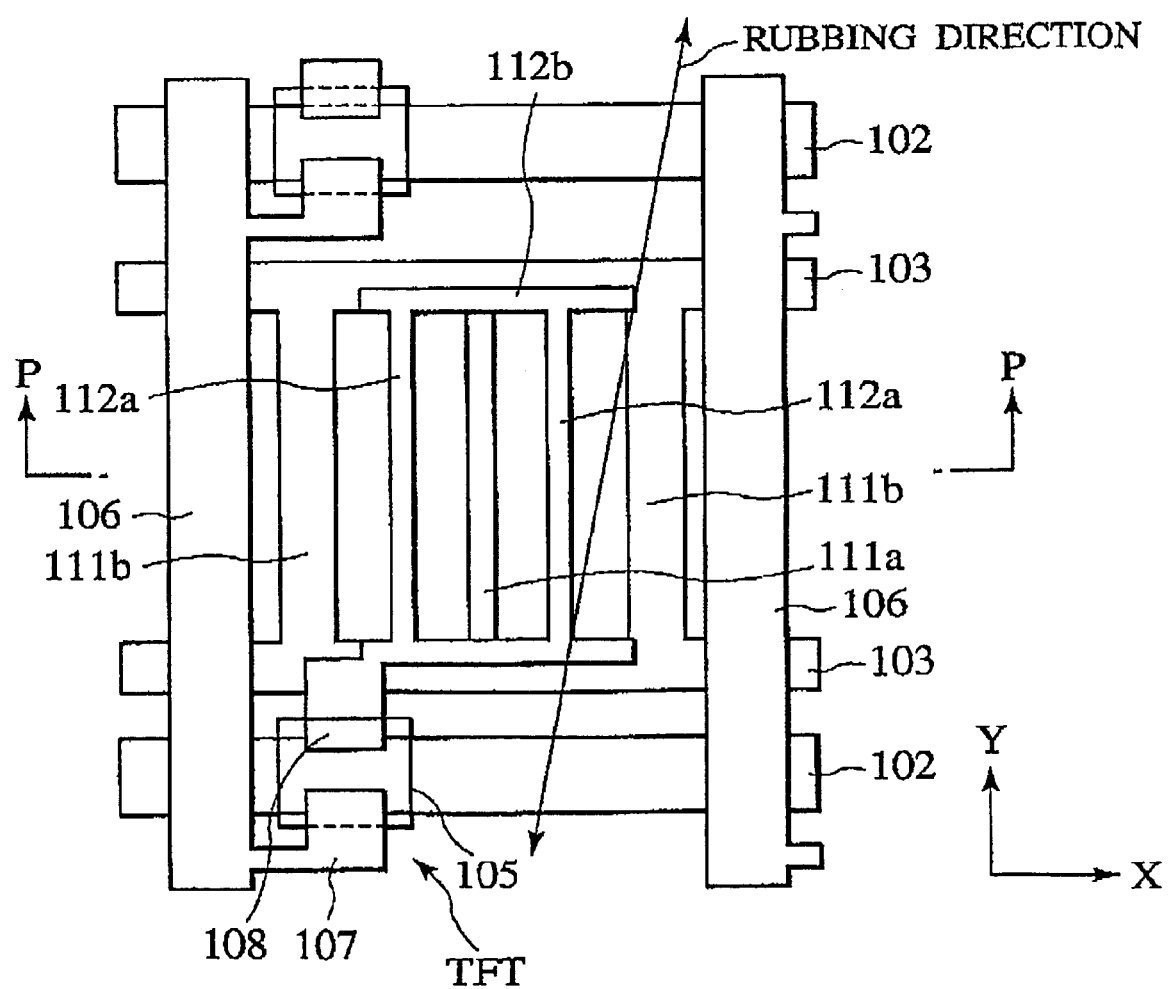
FIG. 14 shows a plan layout of a conventional active matrix type liquid crystal display device.
Figure 15:
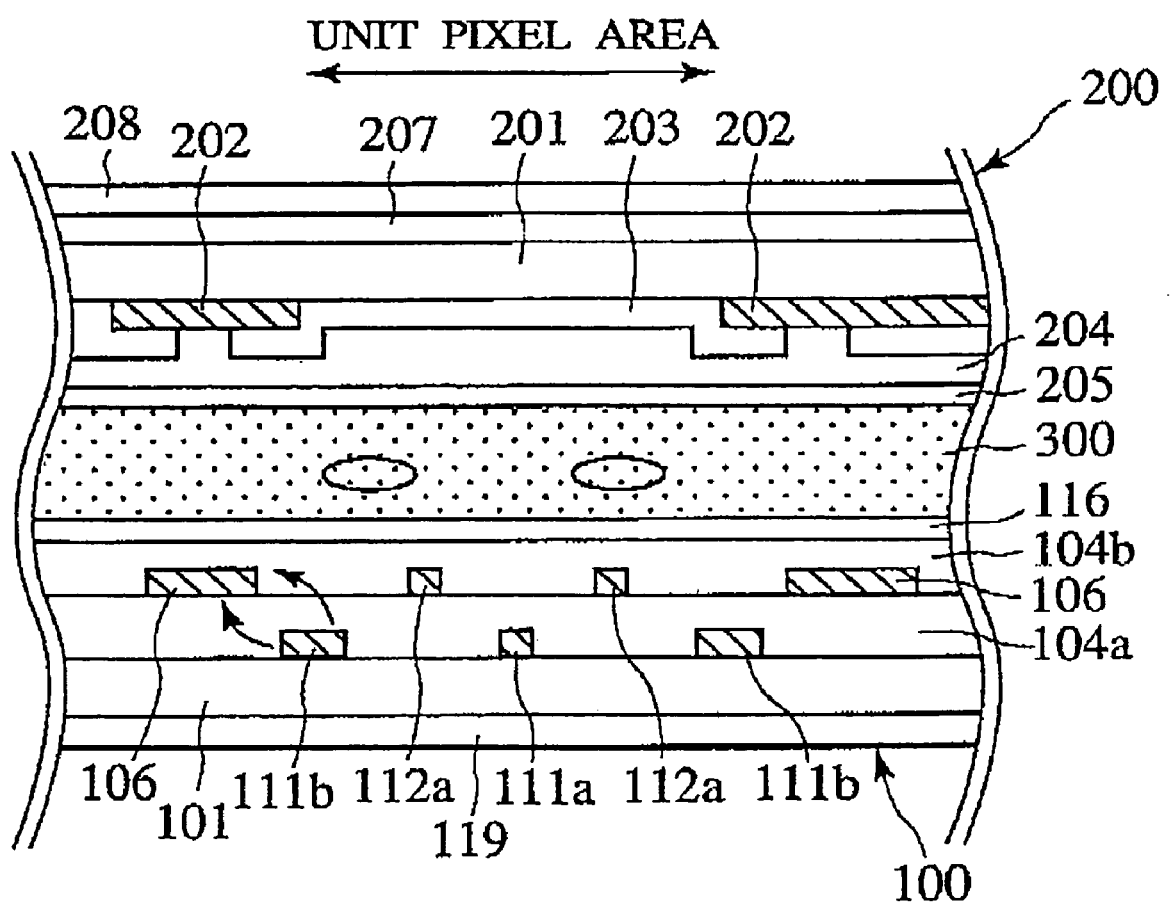
FIG. 15 shows a cross section of FIG. 14 when sectioned along a line PP.
Figure 16:
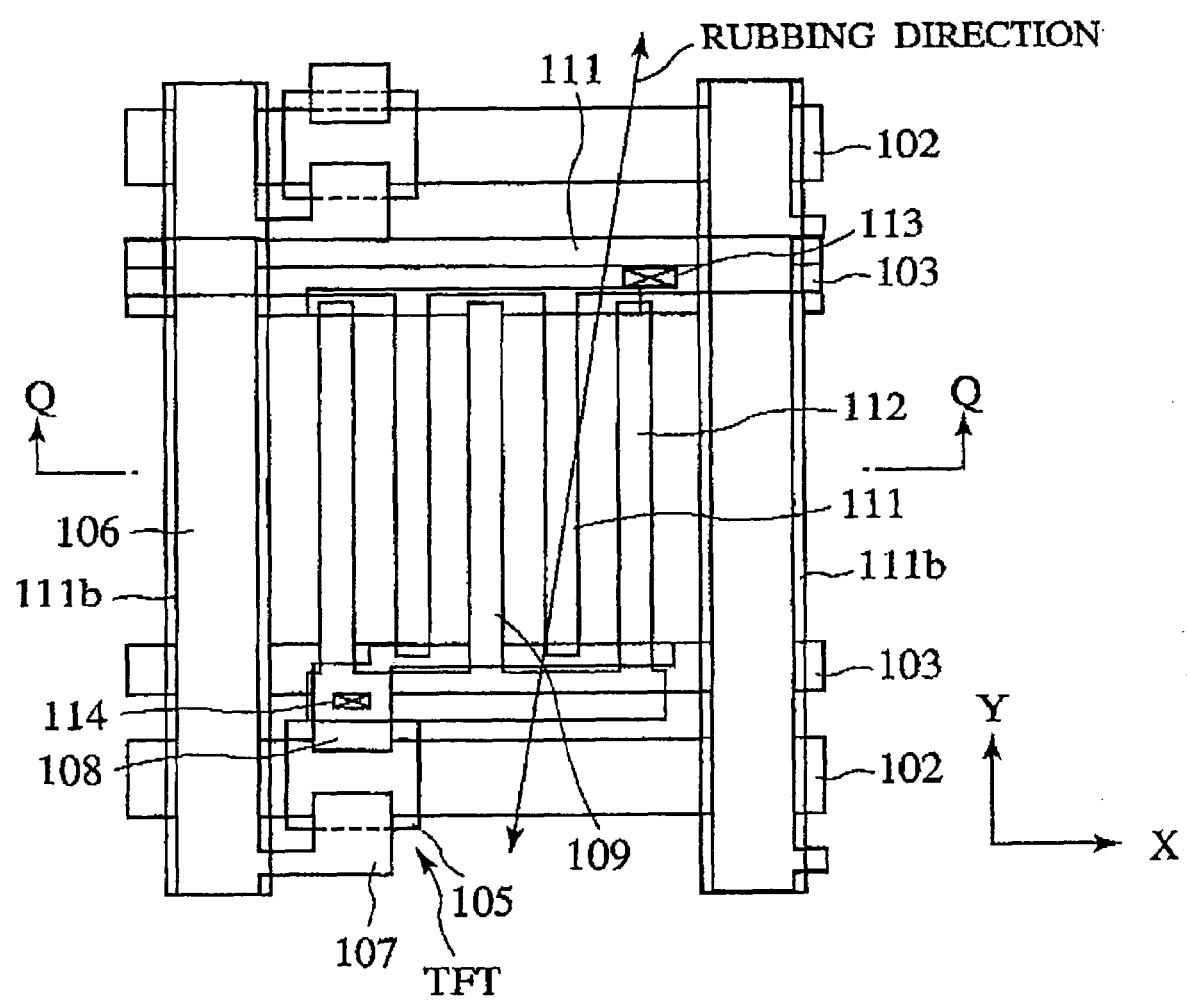
FIG. 16 shows a plan layout of a conventional active matrix type liquid crystal display device.
Figure 17:
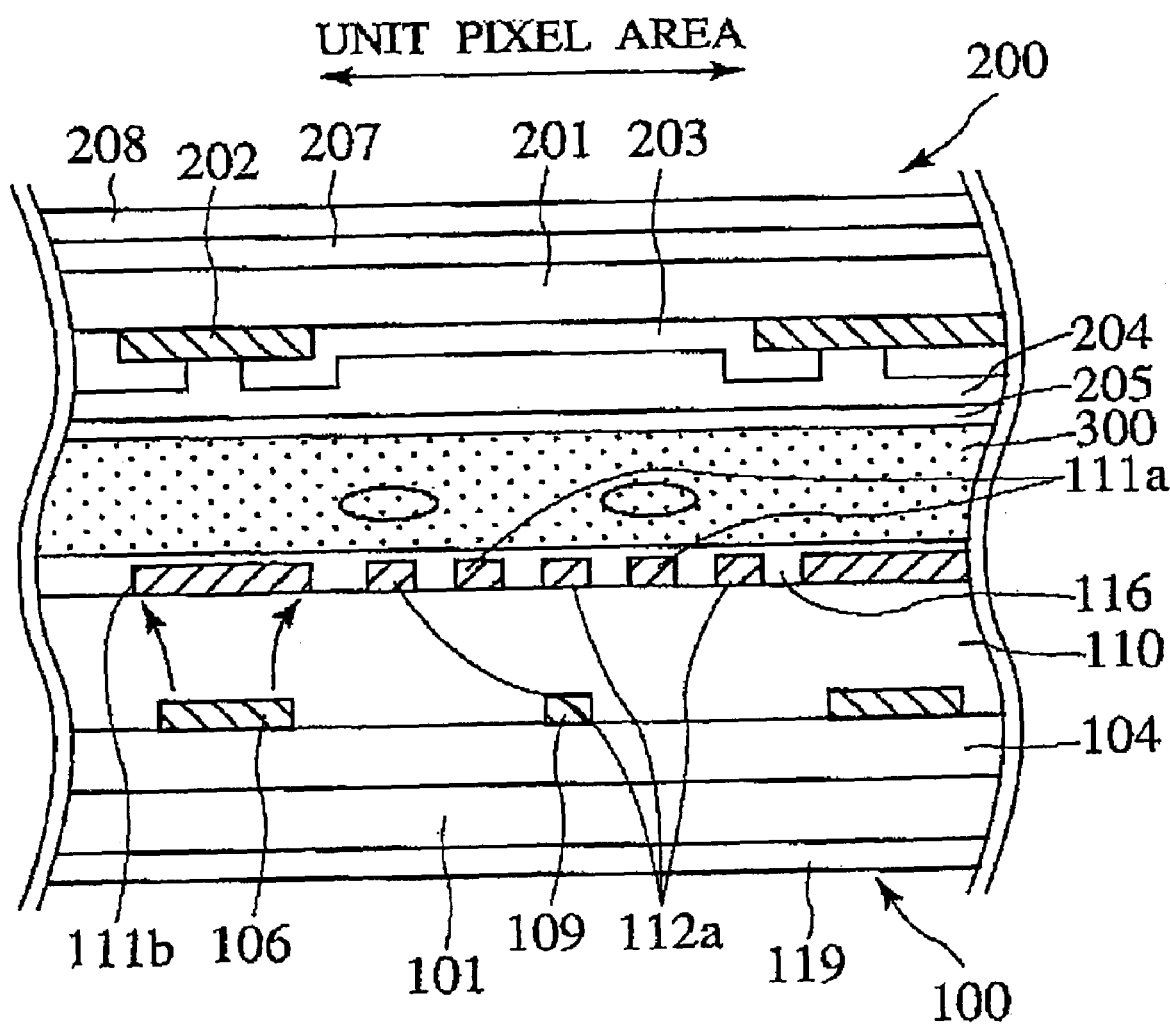
FIG. 17 shows a cross section of FIG. 16 when sectioned along a line QQ.

FIG. 13 shows a structure of a liquid crystal display device according to a fifth embodiment of the present invention. The plan layout of a unit pixel area of the liquid crystal display device according to the fifth embodiment is identical to the plan layout of the unit pixel area of the first embodiment shown in FIG. 3. Thus, illustration of the plan layout is omitted, and a cross section of the unit pixel area as sectioned along a line corresponding to the line AA of FIG. 3 is shown in FIG. 13. Components identical to those shown in FIG. 3, FIG. 4, and FIG. 12 are given the same reference numerals in FIG. 13, and explanation for those components will be omitted.

The liquid crystal display device according to the fifth embodiment has almost the same structure as that of the liquid crystal display device shown in FIG. 12. As shown in FIG. 13, in the TFT substrate 100 of the fifth embodiment, the second pixel electrode 112 is formed on a different layer from the layer on which the common electrode 111 is formed. That is, a third interlayer insulation film 124 which covers the common electrode 111 is formed on the second interlayer insulation film 110, as shown in FIG. 13. The second pixel electrode 112 is formed on the third interlayer insulation film 124, and covered by the orientation film 116. The third interlayer insulation film 124 is made of a silicon oxide film, an inorganic film such as a silicon nitride film, or an organic film such as resin, or a multi-layered film made of those films.

The second pixel electrode 112 is connected to the source electrode 108 via the contact hole 114 for pixel electrode shown in FIG. 3, which is made so as to penetrate the third interlayer insulation film 124.

Such a structure of the liquid crystal display device in which the common electrode 111 and the second pixel electrode 112 are formed on different layers has the following advantages. For example, since the common electrode 111 and the second pixel electrode 112 are relatively apart from each other, a display defect such as an unlit pixel due to an electric short circuit between the two electrodes is caused less frequently. And from a viewpoint of design, different layouts and materials can be employed for the common electrode 111 and the second pixel electrode 112 respectively, because the two electrodes are not manufactured in a same step. Accordingly, display quality can further be improved.

In the first to fifth embodiments, an active matrix type liquid crystal display device comprising TFTs is explained for an example. However, TFTs are not the limitation for the present invention, but diodes, MIMs, or the like may be used as the active elements. The TFTs may be either a reverse staggered type or a normal staggered type. Further, the liquid crystal display device may be the passive type which does not comprise active elements.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2001-073880 filed on Mar. 15, 2001 and including specification, claims, drawings and summary. The disclosure of the above Japanese Patent Application is incorporated herein by reference in its entirety.

What is claimed is:

1. An active matrix type liquid crystal display device comprising:
   a pair of substrates;
   a liquid crystal sealed between said pair of substrates;
   a plurality of data lines and a plurality of scanning lines which are arranged so as to intersect each other on one surface of a first of said pair of substrates;
   a switching element having an electric current path, one end of which is connected to a corresponding one of said data lines, and having a control terminal which is connected to a corresponding one of said scanning lines;
   a pixel electrode which is provided above said data lines via an insulation film, and is connected to the other end of the electric current path of said switching element;
   a common electrode which opposes said data lines via said insulation film, said common electrode having slits in portions overlapping said data lines;
   a black matrix which is arranged on a second of said pair of substrates in a predetermined pattern, said black matrix having a portion covered by a flattening film; and
   a first conductive film provided on said flattening film so as to oppose said data lines via said slits, said first conductive film being set to a common electric potential with said common electrode;
   wherein said first conductive film overlaps said portions of said common electrode where said slits are formed;
   wherein an electric field can be generated between said common electrode and said pixel electrode;
   wherein at least some portions of said common electrode that are adjacent to said slits overlap at least some portions of said data lines;
   wherein said portion of said black matrix is located opposite a data line of said plurality of data lines and has a width that is less than a width of said data line and that is at least slightly larger than a width of a slit in a portion of said common electrode that is overlapping said data line; and
   wherein said first conductive film has a width that is at least larger than the width of said portion of said black matrix.

2. The active matrix type liquid crystal display device according to claim 1, wherein said first conductive film has a pattern which is almost the same as that of said black matrix.

3. The active matrix type liquid crystal display device according to claim 1, wherein said first conductive film is made of ITO (Indium Tin Oxide).

4. A method of manufacturing an active matrix type liquid crystal display device, said liquid crystal display device including: a pair of substrates, a thin film transistor which is provided on one of said pair of substrates, data lines which are connected to a drain of said thin film transistor, a pixel electrode which is connected to a source of said thin film transistor, and a common electrode which generates an electric field between said pixel electrode, said method comprising:
   forming an insulation film which covers said data lines;
   forming a first metal film on said insulation film;
   forming said common electrode by patterning said first metal film, including forming slits in portions of said common electrode that overlap said data lines;
   forming a black matrix having a predetermined pattern on one surface of the other one of said pair of substrates;

forming a flattening film on a portion of said black matrix; and forming a first conductive film on said flattening film, said first conductive film opposing said data lines via said slits;

wherein said first conductive film overlaps said portions of said common electrode where said slits are formed;

wherein at least some portions of said common electrode that are adjacent to said slits overlap at least some portions of said data lines;

wherein said portion of said black matrix is located opposite a data line of said data lines and has a width that is less than a width of said data line and that is at least slightly larger than a width of a slit in a portion of said common electrode that is overlapping said data line; and wherein said first conductive film has a width that is at least larger than the width of said portion of said black matrix.

5. The method of manufacturing an active matrix type liquid crystal display device according to claim 4, wherein in said forming said first conductive film, said first conductive film is formed in a pattern that is the same as that of said black matrix.

6. The method of manufacturing an active matrix type liquid crystal display device according to claim 4, wherein said forming a first conductive film includes forming said first conductive film by using ITO (Indium Tin Oxide).

* * * * *